United States Patent
Sarwer et al.

(10) Patent No.: US 11,924,417 B2
(45) Date of Patent: Mar. 5, 2024

(54) METHODS AND SYSTEMS FOR CROSS-COMPONENT ADAPTIVE LOOP FILTER

(71) Applicant: Alibaba Singapore Holding Private Limited, Singapore (SG)

(72) Inventors: Mohammed Golam Sarwer, San Mateo, CA (US); Ru-Ling Liao, San Mateo, CA (US); Jie Chen, San Mateo, CA (US); Yan Ye, San Mateo, CA (US); Xinwei Li, San Mateo, CA (US)

(73) Assignee: Alibaba Singapore Holding Private Limited, Singapore (SG)

( * ) Notice: Subject to any disclaimer, the term of this patent is extended or adjusted under 35 U.S.C. 154(b) by 0 days.

(21) Appl. No.: 17/808,933

(22) Filed: Jun. 24, 2022

(65) Prior Publication Data
US 2023/0007245 A1 Jan. 5, 2023

Related U.S. Application Data

(60) Provisional application No. 63/235,111, filed on Aug. 19, 2021, provisional application No. 63/215,521, filed on Jun. 28, 2021.

(51) Int. Cl.
| | | |
|---|---|---|
| *H04N 19/117* | (2014.01) | |
| *H04N 19/169* | (2014.01) | |
| *H04N 19/186* | (2014.01) | |
| *H04N 19/70* | (2014.01) | |
| *H04N 19/82* | (2014.01) | |

(52) U.S. Cl.
CPC ......... *H04N 19/117* (2014.11); *H04N 19/186* (2014.11); *H04N 19/1883* (2014.11); *H04N 19/1887* (2014.11); *H04N 19/70* (2014.11); *H04N 19/82* (2014.11)

(58) Field of Classification Search
None
See application file for complete search history.

(56) References Cited

U.S. PATENT DOCUMENTS

| | | | | |
|---|---|---|---|---|
| 2012/0189064 A1* | 7/2012 | Kossentini | ........... | H04N 19/117 375/E7.193 |
| 2022/0408085 A1* | 12/2022 | Lim | ..................... | H04N 19/186 |

OTHER PUBLICATIONS

Kotra, A. M., Esenlik, S., Wang, B., Gao, H., & Alshina, E. (n.d.). AHG16/CE5-Related: Simplifications for Cross Component Adaptive Loop Filter. JVET-P0106-v1. 16th Meeting: Geneva, CH. Oct. 1-11, 2019. (Year: 2019).*

"Requirements for a Future Video Coding Standard v5," International Organisation for Standardisation, Torino, IT, 14 pages (2017).

Bross et al., "Versatile Video Coding Editorial Refinements on Draft 10," JVET-T2002-v2, 20th Meeting, by teleconference, Oct. 7-16, 2020, 511 pages.

Chang et al., "Compression efficiency methods beyond VVC," JVET-U0100, 21st Meeting, by teleconference, Jan. 6-15, 2021, 13 pages.

(Continued)

*Primary Examiner* — Kaitlin A Retallick

(74) *Attorney, Agent, or Firm* — Finnegan, Henderson, Farabow, Garrett & Dunner, LLP

(57) ABSTRACT

A method for video processing using Cross-Component Adaptive Loop Filter (CCALF) is provided. The method includes filtering decoded video content using a CCALF, wherein the CCALF is a 24-tap 9×9 filter.

14 Claims, 41 Drawing Sheets

(56) References Cited

OTHER PUBLICATIONS

Chen et al., "Algorithm Description of Joint Exploration Test Model 7 (JEM 7)," JVET-G1001-v1, 7th Meeting: Torino, IT, Jul. 13-21, 2017, 50 pages.
Chen et al., "Algorithm description for Versatile Video Coding and Test Model 11 (VTM 11)," JVET-T2002-v1, 20th meeting by teleconference, Oct. 7-16, 2020, 104 pages.
Chen et al., "Algorithm description for Versatile Video Coding and Test Model 12 (VTM 12), "JVET-U2002-v1, 21st Meeting, by teleconference, Jan. 6-15, 2021, 101 pages.
Chiang et al., "CE10.1.1: Multi-hypothesis prediction for improving AMVP mode, skip or merge mode, and intra mode," JVET-L0100-v3, 12th meeting, Macao, CN, Oct. 3-12, 2018, 15 pages.
International Telecommunications Union "Series H: Audiovisual and Multimedia Systems Infrastructure of audiovisual services—Coding of moving video", ITU-T Telecommunication Standardization Sector of ITU, Nov. 2019, 712 pages.
JEM, https://jvet.hhi.fraunhofer.de/svn/svn_HMJEMSoftware.
Sullivan et al., "Overview of the High Efficiency Video Coding (HEVC) Standard," IEE Transactions on Circuits and Systems for Video Technology, vol. 22, No. 12, pp. 1649-1668 (2012).
Zhou et al., "EE2-Related: Improvements of Decoder-Side Intra Mode Derivation," JVET-V0087, 22nd Meeting, by teleconference, Apr. 20-28, 2021, 6 pages.

\* cited by examiner alf_cc_cb_filters_signalled_minus1 plus 1 specifies the number of cross-component filters for the Cb colour component signalled in the current ALF APS. The value of alf_cc_cb_filters_signalled_minus1 shall be in the range of 0 to 3 /9, inclusive.

alf_cc_cb_filters_shape_idx[k] specifies the shape of the of the signalled k-th cross-component filter for the Cb colour component. The value of alf_cc_cb_filters_shape_idx[k] shall be in the range of 0 to alf_cc_cb_filters_signalled_minus1, inclusive.

The signalled k-th cross-component filter shape for the Cb colour component
CcAlfApsShape$_{Cb}$[ aps_adaptation_parameter_set_id ][ k ] is derived as follows:

CcAlfApsShape$_{Cb}$[ aps_adaptation_parameter_set_id ][ k ] = alf_cc_cb_filters_shape_idx[k]

alf_cc_cb_mapped_coeff_abs[ k ][ j ] specifies the absolute value of the j-th mapped coefficient of the signalled k-th cross-component filter for the Cb colour component. When alf_cc_cb_mapped_coeff_abs[ k ][ j ] is not present, it is inferred to be equal to 0.

alf_cc_cb_coeff_sign[ k ][ j ] specifies the sign of the j-th coefficient of the signalled k-th cross-component filter for the Cb colour component as follows:

- If alf_cc_cb_coeff_sign[ k ][ j ] is equal to 0, the corresponding cross-component filter coefficient has a positive value.
- Otherwise (alf_cc_cb_sign[ k ][ j ] is equal to 1), the corresponding cross-component filter coefficient has a negative value.

When alf_cc_cb_coeff_sign[ k ][ j ] is not present, it is inferred to be equal to 0.

The signalled k-th cross-component filter coefficients for the Cb colour component
CcAlfApsCoeff$_{Cb}$[ aps_adaptation_parameter_set_id ][ k ][ j ], with j = 0 ..
noCoeff(CcAlfApsShapeCb[ aps_adaptation_parameter_set_id ][ k ]) − 1 6 are derived as follows:

- If alf_cc_cb_mapped_coeff_abs[ k ][ j ] is equal to 0,
  CcAlfApsCoeff$_{Cb}$[ aps_adaptation_parameter_set_id ][ k ][ j ] is set equal to 0.
- Otherwise, CcAlfApsCoeff$_{Cb}$[ aps_adaptation_parameter_set_id ][ k ][ j ] is set equal to
  ( 1 − 2 * alf_cc_cb_coeff_sign[ k ][ j ] ) * 2$^{alf\_cc\_cb\_mapped\_coeff\_abs[ k ][ j ] − 1}$ alf_cc_cr_filters_signalled_minus1 plus 1 specifies the number of cross-component filters for the Cr colour component signalled in the current ALF APS. The value of alf_cc_cr_filters_signalled_minus1 shall be in the range of 0 to 3 /9, inclusive.

alf_cc_cr_filters_shape_idx[k] specifies the shape of the of the signalled k-th cross-component filter for the Cr colour component. The value of alf_cc_cr_filters_shape_idx[k] shall be in the range of 0 to alf_cc_cr_filters_signalled_minus1, inclusive.

The signalled k-th cross-component filter shape for the Cr colour component
CcAlfApsShape$_{Cr}$[ aps_adaptation_parameter_set_id ][ k ] is derived as follows:

CcAlfApsShape$_{Cr}$[ aps_adaptation_parameter_set_id ][ k ] = alf_cc_cr_filters_shape_idx[k]

FIG. 10 alf_cc_cr_mapped_coeff_abs[ k ][ j ] specifies the absolute value of the j-th mapped coefficient of the signalled k-th cross-component filter for the Cr colour component. When alf_cc_cr_mapped_coeff_abs[ k ][ j ] is not present, it is inferred to be equal to 0.

alf_cc_cr_coeff_sign[ k ][ j ] specifies the sign of the j-th coefficient of the signalled k-th cross-component filter for the Cr colour component as follows:

— If alf_cc_cr_coeff_sign[ k ][ j ] is equal to 0, the corresponding cross-component filter coefficient has a positive value.

— Otherwise (alf_cc_cr_sign[ k ][ j ] is equal to 1), the corresponding cross-component filter coefficient has a negative value.

When alf_cc_cr_coeff_sign[ k ][ j ] is not present, it is inferred to be equal to 0.

The signalled k-th cross-component filter coefficients for the Cr colour component CcAlfApsCoeff$_{Cr}$[ aps_adaptation_parameter_set_id ][ k ][ j ], with j = 0..noCoeff[CcAlfApsShape$_{Cr}$[ aps_adaptation_parameter_set_id ][ k ]] − 1 are derived as follows:       1020

— If alf_cc_cr_mapped_coeff_abs[ k ][ j ] is equal to 0, CcAlfApsCoeff$_{Cr}$[ aps_adaptation_parameter_set_id ][ k ][ j ] is set equal to 0.

Otherwise, CcAlfApsCoeff$_{Cr}$[ aps_adaptation_parameter_set_id ][ k ][ j ] is set equal to
( 1 − 2 * alf_cc_cr_coeff_sign[ k ][ j ] ) * $2^{alf\_cc\_cr\_mapped\_coeff\_abs[k][j] - 1}$.

FIG. 10 (continued)

| Exemplary ALF APS syntax of the proposed method | |
|---|---|
| alf_data( ) { | Descriptor |
|   if( alf_cc_cb_filter_signal_flag ) { | |
|     alf_cc_cb_filters_signalled_minus1 | ue(v) |
|     for( k = 0; k <= alf_cc_cb_filters_signalled_minus1; k++ ) { | |
|       *alf_cc_cb_filters_shape_idx[k]* | *ue(v)* | 1110
|       *for( j = 0; j < 7 noCoeff[alf_cc_cb_filters_shape_idx[k]]; j++ ) {* | | 1130
|         alf_cc_cb_mapped_coeff_abs[ k ][ j ] | u(3) |
|         if( alf_cc_cb_mapped_coeff_abs[ k ][ j ] ) | |
|           alf_cc_cb_coeff_sign[ k ][ j ] | u(1) |
|       } | |
|     } | |
|   } | |
|   if( alf_cc_cr_filter_signal_flag ) { | |
|     alf_cc_cr_filters_signalled_minus1 | ue(v) |
|     for( k = 0; k < alf_cc_cr_filters_signalled_minus1 + 1; k++ ) { | |
|       *alf_cc_cr_filters_shape_idx[k]* | *ue(v)* | 1120
|       *for( j = 0; j < 7 noCoeff[alf_cc_cr_filters_shape_idx[k]]; j++ ) {* | | 1140
|         alf_cc_cr_mapped_coeff_abs[ k ][ j ] | u(3) |
|         if( alf_cc_cr_mapped_coeff_abs[ k ][ j ] ) | |
|           alf_cc_cr_coeff_sign[ k ][ j ] | u(1) |
|       } | |
|     } | |
|   } | |
| } | |

FIG. 11

General

Inputs of this process are the reconstructed picture sample array prior to adaptive loop filter recPicture$_L$ and, when sps_chroma_format_idc is not equal to 0, the arrays recPicture$_{Cb}$ and recPicture$_{Cr}$.

Outputs of this process are the modified reconstructed picture sample array after adaptive loop filter alfPicture$_L$ and, when sps_chroma_format_idc is not equal to 0, the arrays ccAlfPicture$_{Cb}$ and ccAlfPicture$_{Cr}$.

.....

– For every coding tree unit with luma coding tree block location ( rx, ry ), where rx = 0..PicWidthInCtbsY − 1 and ry = 0..PicHeightInCtbsY − 1, the following applies:

– When sps_chroma_format_idc is not equal to 0 and alf_ctb_cc_cb_idc[ rx ][ ry ] is not equal to 0, the cross-component filtering process as specified in clause 8.8.5.7 is invoked with recPicture$_L$ set equal to recPicture$_L$, alfPicture$_C$ set equal to alfPicture$_{Cb}$, the chroma coding tree block location ( xCtbC, yCtbC ) set equal to ( ( rx << CtbLog2SizeY ) / SubWidthC, ( ry << CtbLog2SizeY ) / SubHeightC ) ), ccAlfWidth set equal to ( 1 << CtbLog2SizeY ) / SubWidthC, ccAlfHeight set equal to ( 1 << CtbLog2SizeY ) / SubHeightC, *the cross component filter shape CcAlfShape set equal to CcAlfApsShape$_{Cb}$[ sh_alf_cc_cb_aps_id ][ alf_ctb_cc_cb_idc[ rx ][ ry ] − 1 ]* and the cross-component filter coefficients CcAlfCoeff[ j ] set equal to CcAlfApsCoeff$_{Cb}$[ sh_alf_cc_cb_aps_id ][ alf_ctb_cc_cb_idc[ rx ][ ry ] − 1 ][ j ], with j = 0..*noCoeff[CcAlfShape]* − 1, as inputs, and the output is the modified filtered picture ccAlfPicture$_{Cb}$.  — 1210

– When sps_chroma_format_idc is not equal to 0 and alf_ctb_cc_cr_idc[ rx ][ ry ] is not equal to 0, the cross-component filtering process as specified in clause 8.8.5.7 is invoked with recPicture$_L$ set equal to recPicture$_L$, alfPicture$_C$ set equal to alfPicture$_{Cr}$, the chroma coding tree block location ( xCtbC, yCtbC ) set equal to ( ( rx << CtbLog2SizeY ) / SubWidthC, ( ry << CtbLog2SizeY ) / SubHeightC ) ), ccAlfWidth set equal to ( 1 << CtbLog2SizeY ) / SubWidthC, ccAlfHeight set equal to ( 1 << CtbLog2SizeY ) / SubHeightC, *the cross component filter shape CcAlfShape set equal to CcAlfApsShape$_{Cr}$[ sh_alf_cc_cr_aps_id ][ alf_ctb_cc_cr_idc[ rx ][ ry ] − 1 ]* and the cross-component filter coefficients CcAlfCoeff[ j ] set equal to CcAlfApsCoeff$_{Cr}$[ sh_alf_cc_cr_aps_id ][ alf_ctb_cc_cr_idc[ rx ][ ry ] − 1 ][ j ], with j = 0..*noCoeff[CcAlfShape]* − 1, as inputs, and the output is the modified filtered picture ccAlfPicture$_{Cr}$.  — 1210

FIG. 12

Cross-component filtering process

Inputs of this process are:

– a reconstructed luma picture sample array recPicture$_L$ prior to the luma adaptive loop filtering process, – a filtered reconstructed chroma picture sample array alfPicture$_C$, – a chroma location ( xCtbC, yCtbC ) specifying the top-left sample of the current chroma coding tree block relative to the top-left sample of the current picture, – a CTB width ccAlfWidth in chroma samples, – a CTB height ccAlfHeight in chroma samples, – *cross-component filter shape CcAlfShape*

– *cross-component filter coefficients CcAlfCoeff[ j ], with j = 0.. noCoeff[CcAlfShape] − 1.*

1210

Output of this process is the modified filtered reconstructed chroma picture sample array ccAlfPicture.

For the derivation of the filtered reconstructed chroma samples ccAlfPicture[ xCtbC + x ][ yCtbC + y ], each reconstructed chroma sample inside the current chroma block of samples alfPicture$_C$[ xCtbC + x ][ yCtbC + y ] with x = 0..ccAlfWidth − 1, y = 0..ccAlfHeight − 1, is filtered as follows:

– The luma location ( xL, yL ) corresponding to the current chroma sample at chroma location ( xCtbC + x, yCtbC + y ) is set equal to ( ( xCtbC + x ) * SubWidthC, ( yCtbC + y ) * SubHeightC ).

....

– *The variable yP1 is set to 1.*

– *The variable yP2 is set to 2.*

– *The variable yP3 is set to 3.*

– *The variable yP4 is set to 4.*

1220

– The variable curr is derived as follows:

– curr = alfPictureC[ xCtbC + x ][ yCtbC + y ]        (1501)

– The array of cross-component filter coefficients f[ j ] is derived as follows with j = 0..6:

– f[ j ] = CcAlfCoeff[ j ]        (1502)

FIG. 12 (Continued)

- If CcAlfShape is equal to 0, the variable sum is derived as follows:
  sum =      $f[0] * (recPicture_L[h_{x,y-yP4}][v_{y-yP4}] - recPicture_L[h_{x,y}][v_y]) +$
         $f[1] * (recPicture_L[h_{x,y-yP3}][v_{y-yP3}] - recPicture_L[h_{x,y}][v_y]) +$
         $f[2] * (recPicture_L[h_{x,y-yP2}][v_{y-yP2}] - recPicture_L[h_{x,y}][v_y]) +$
         $f[3] * (recPicture_L[h_{x,y-yP1}][v_{y-yP1}] - recPicture_L[h_{x,y}][v_y]) +$
         $f[4] * (recPicture_L[h_{x-4,y}][v_y] - recPicture_L[h_{x,y}][v_y]) +$
         $f[5] * (recPicture_L[h_{x-3,y}][v_y] - recPicture_L[h_{x,y}][v_y]) +$
         $f[6] * (recPicture_L[h_{x-2,y}][v_y] - recPicture_L[h_{x,y}][v_y]) +$
         $f[7] * (recPicture_L[h_{x-1,y}][v_y] - recPicture_L[h_{x,y}][v_y]) +$
         $f[8] * (recPicture_L[h_{x+1,y}][v_y] - recPicture_L[h_{x,y}][v_y]) +$
         $f[9] * (recPicture_L[h_{x+2,y}][v_y] - recPicture_L[h_{x,y}][v_y]) +$
         $f[10] * (recPicture_L[h_{x+3,y}][v_y] - recPicture_L[h_{x,y}][v_y]) +$
         $f[11] * (recPicture_L[h_{x+4,y}][v_y] - recPicture_L[h_{x,y}][v_y]) +$
         $f[12] * (recPicture_L[h_{x,y+yP1}][v_{y+yP1}] - recPicture_L[h_{x,y}][v_y]) +$
         $f[13] * (recPicture_L[h_{x,y+yP2}][v_{y+yP2}] - recPicture_L[h_{x,y}][v_y]) +$
         $f[14] * (recPicture_L[h_{x,y+yP3}][v_{y+yP3}] - recPicture_L[h_{x,y}][v_y]) +$
         $f[15] * (recPicture_L[h_{x,y+yP4}][v_{y+yP4}] - recPicture_L[h_{x,y}][v_y]) +$

- Otherwise, if CcAlfShape is equal to 1, the variable sum is derived as follows:
  sum =     $f[0] * (recPicture_L[h_{x,y-yP1}][v_{y-yP1}] - recPicture_L[h_{x,y}][v_y]) +$
        $f[1] * (recPicture_L[h_{x-3,y}][v_y] - recPicture_L[h_{x,y}][v_y]) +$
        $f[2] * (recPicture_L[h_{x-2,y}][v_y] - recPicture_L[h_{x,y}][v_y]) +$
        $f[3] * (recPicture_L[h_{x-1,y}][v_y] - recPicture_L[h_{x,y}][v_y]) +$
        $f[4] * (recPicture_L[h_{x+1,y}][v_y] - recPicture_L[h_{x,y}][v_y]) +$
        $f[5] * (recPicture_L[h_{x+2,y}][v_y] - recPicture_L[h_{x,y}][v_y]) +$
        $f[6] * (recPicture_L[h_{x+3,y}][v_y] - recPicture_L[h_{x,y}][v_y]) +$
        $f[7] * (recPicture_L[h_{x-3,y+yP1}][v_{y+yP1}] - recPicture_L[h_{x,y}][v_y]) +$
        $f[8] * (recPicture_L[h_{x-2,y+yP1}][v_{y+yP1}] - recPicture_L[h_{x,y}][v_y]) +$
        $f[9] * (recPicture_L[h_{x-1,y+yP1}][v_{y+yP1}] - recPicture_L[h_{x,y}][v_y]) +$
        $f[10] * (recPicture_L[h_{x,y+yP1}][v_{y+yP1}] - recPicture_L[h_{x,y}][v_y]) +$
        $f[11] * (recPicture_L[h_{x+1,y+yP1}][v_{y+yP1}] - recPicture_L[h_{x,y}][v_y]) +$
        $f[12] * (recPicture_L[h_{x+2,y+yP1}][v_{y+yP1}] - recPicture_L[h_{x,y}][v_y]) +$

-     $f[13] * (recPicture_L[h_{x+3,y+yP1}][v_{y+yP1}] - recPicture_L[h_{x,y}][v_y]) +$
      $f[14] * (recPicture_L[h_{x,y+yP2}][v_{y+yP2}] - recPicture_L[h_{x,y}][v_y])$

- Otherwise, if CcAlfShape is equal to 2, the variable sum is derived as follows:
  sum =     $f[0] * (recPicture_L[h_{x,y-yP3}][v_{y-yP3}] - recPicture_L[h_{x,y}][v_y]) +$
       $f[1] * (recPicture_L[h][v_y]) + f[5] * (recPicture_L[h_{x-1,y+yP1}][v_{y+yP1}] -$
  $recPictu_{x,y-yP2}][v_{y-yP2}] - recPicture_L[h_{x,y}][v_y]) +$
        $f[2] * (recPicture_L[h_{x,y-yP1}][v_{y-yP1}] - recPicture_L[h_{x,y}][v_y]) +$
        $f[3] * (recPicture_L[h_{x-1,y}][v_y] - recPicture_L[h_{x,y}][v_y]) +$
        $f[4] * (recPicture_L[h_{x+1,y}][v_y] - recPicture_L[h_{x,y}rec[h_{x,y}][v_y]) +$
        $f[6] * (recPicture_L[h_{x,y+yP1}][v_{y+yP1}] - recPicture_L[h_{x,y}][v_y]) +$
        $f[7] * (recPicture_L[h_{x+1,y+yP1}][v_{y+yP1}] - recPicture_L[h_{x,y}][v_y]) +$
        $f[8] * (recPicture_L[h_{x,y+yP2}][v_{y+yP2}] - recPicture_L[h_{x,y}][v_y]) +$
        $f[9] * (recPicture_L[h_{x,y+yP3}][v_{y+yP3}] - recPicture_L[h_{x,y}][v_y]) +$
        $f[10] * (recPicture_L[h_{x,y+yP4}][v_{y+yP4}] - recPicture_L[h_{x,y}][v_y])$

- *Otherwise, if CcAlfShape is equal to 3, the variable sum is derived as follows:* sum =    f[ 0 ] * ( recPicture_L[ h_{x-3, y-yP3} ][ v_{y-yP3} ] − recPicture_L[ h_{x, y} ][ v_y ] ) +      1220
           f[ 1 ] * ( recPicture_L[ h_{x+3, y-yP3} ][ v_{y-yP3} ] − recPicture_L[ h_{x, y} ][ v_y ] ) +
           f[ 2 ] * ( recPicture_L[ h_{x-2, y-yP2} ][ v_{y-yP2} ] − recPicture_L[ h_{x, y} ][ v_y ] ) +
           f[ 3 ] * ( recPicture_L[ h_{x+2, y-yP2} ][ v_{y-yP2} ] − recPicture_L[ h_{x, y} ][ v_y ] ) +
           f[ 4 ] * ( recPicture_L[ h_{x-1, y} ][ v_y ] − recPicture_L[ h_{x, y} ][ v_y ] ) +
           f[ 5 ] * ( recPicture_L[ h_{x+1, y} ][ v_y ] − recPicture_L[ h_{x, y} ][ v_y ] ) +
           f[ 6 ] * ( recPicture_L[ h_{x-1, y+yP1} ][ v_{y+yP1} ] − recPicture_L[ h_{x, y} ][ v_y ] ) +
           f[ 7 ] * ( recPicture_L[ h_{x, y+yP1} ][ v_{y+yP1} ] − recPicture_L[ h_{x, y} ][ v_y ] ) +
           f[ 8 ] * ( recPicture_L[ h_{x+1, y+yP1} ][ v_{y+yP1} ] − recPicture_L[ h_{x, y} ][ v_y ] ) +
           f[ 9 ] * ( recPicture_L[ h_{x-2, y+yP2} ][ v_{y+yP2} ] − recPicture_L[ h_{x, y} ][ v_y ] ) +
           f[ 10 ] * ( recPicture_L[ h_{x+2, y+yP2} ][ v_{y+yP2} ] − recPicture_L[ h_{x, y} ][ v_y ] ) +
           f[ 11 ] * ( recPicture_L[ h_{x-2, y+yP3} ][ v_{y+yP3} ] − recPicture_L[ h_{x, y} ][ v_y ] ) +
           f[ 12 ] * ( recPicture_L[ h_{x+2, y+yP4} ][ v_{y+yP4} ] − recPicture_L[ h_{x, y} ][ v_y ] )

- *Otherwise, if CcAlfShape is equal to 4, the variable sum is derived as follows:* sum =    f[ 0 ] * ( recPicture_L[ h_{x, y-yP1} ][ v_{y-yP1} ] − recPicture_L[ h_{x, y} ][ v_y ] ) +
           f[ 1 ] * ( recPicture_L[ h_{x-1, y} ][ v_y ] − recPicture_L[ h_{x, y} ][ v_y ] ) +
           f[ 2 ] * ( recPicture_L[ h_{x+1, y} ][ v_y ] − recPicture_L[ h_{x, y} ][ v_y ] ) +
           f[ 3 ] * ( recPicture_L[ h_{x-1, y+yP1} ][ v_{y+yP1} ] − recPicture_L[ h_{x, y} ][ v_y ] ) +
           f[ 4 ] * ( recPicture_L[ h_{x, y+yP1} ][ v_{y+yP1} ] − recPicture_L[ h_{x, y} ][ v_y ] ) +
           f[ 5 ] * ( recPicture_L[ h_{x+1, y+yP1} ][ v_{y+yP1} ] − recPicture_L[ h_{x, y} ][ v_y ] ) +
           f[ 6 ] * ( recPicture_L[ h_{x, y+yP2} ][ v_{y+yP2} ] − recPicture_L[ h_{x, y} ][ v_y ] )

scaledSum = Clip3( −( 1 << ( BitDepth − 1 ) ), ( 1 << ( BitDepth − 1 ) ) − 1, ( sum + 64 ) >> 7 )      (1504)

sum = curr + scaledSum      (1505)

- The modified filtered reconstructed chroma picture sample ccAlfPicture[ xCtbC + x ][ yCtbC + y ] is derived as follows:
  ccAlfPicture[ xCtbC + x ][ yCtbC + y ] = Clip3( 0, ( 1 << BitDepth ) − 1, sum )   (1506)

FIG. 12 (Continued)

alf_cc_cb_filters_signalled_minus1 plus 1 specifies the number of cross-component filters for the Cb colour component signalled in the current ALF APS. The value of alf_cc_cb_filters_signalled_minus1 shall be in the range of 0 to 3, inclusive.

alf_cc_cb_~~mapped_~~coeff_abs[ k ][ j ] specifies the absolute value of the j-th ~~mapped~~ coefficient of the signalled k-th cross-component filter for the Cb colour component. When alf_cc_cb_~~mapped_~~coeff_abs[ k ][ j ] is not present, it is inferred to be equal to 0.

alf_cc_cb_coeff_sign[ k ][ j ] specifies the sign of the j-th coefficient of the signalled k-th cross-component filter for the Cb colour component as follows:

- If alf_cc_cb_coeff_sign[ k ][ j ] is equal to 0, the corresponding cross-component filter coefficient has a positive value.
- Otherwise (alf_cc_cb_sign[ k ][ j ] is equal to 1), the corresponding cross-component filter coefficient has a negative value.

When alf_cc_cb_coeff_sign[ k ][ j ] is not present, it is inferred to be equal to 0.

The signalled k-th cross-component filter coefficients for the Cb colour component CcAlfApsCoeffcb[ aps_adaptation_parameter_set_id ][ k ][ j ], with j = 0..6 are derived as follows:

- ~~If alf_cc_cb_mapped_coeff_abs[ k ][ j ] is equal to 0, CcAlfApsCoeffcb[ aps_adaptation_parameter_set_id ][ k ][ j ] is set equal to 0.~~
- ~~Otherwise, CcAlfApsCoeffcb[ aps_adaptation_parameter_set_id ][ k ][ j ] is set equal to ( 1 − 2 * alf_cc_cb_coeff_sign[ k ][ j ] ) * 2^(alf_cc_cb_mapped_coeff_abs[k][j]) − 1.~~
- *CcAlfApsCoeffcb[ aps_adaptation_parameter_set_id ][ k ][ j ] = ( 1 − 2 * alf_cc_cb_coeff_sign[ k ][ j ] ) * alf_cc_cb_coeff_abs[ k ][ j ]*

1310 alf_cc_cr_filters_signalled_minus1 plus 1 specifies the number of cross-component filters for the Cr colour component signalled in the current ALF APS. The value of alf_cc_cr_filters_signalled_minus1 shall be in the range of 0 to 3, inclusive.

alf_cc_cr_~~mapped_~~coeff_abs[ k ][ j ] specifies the absolute value of the j-th ~~mapped~~ coefficient of the signalled k-th cross-component filter for the Cr colour component. When alf_cc_cr_mapped_coeff_abs[ k ][ j ] is not present, it is inferred to be equal to 0.

alf_cc_cr_coeff_sign[ k ][ j ] specifies the sign of the j-th coefficient of the signalled k-th cross-component filter for the Cr colour component as follows:

- If alf_cc_cr_coeff_sign[ k ][ j ] is equal to 0, the corresponding cross-component filter coefficient has a positive value.
- Otherwise (alf_cc_cr_sign[ k ][ j ] is equal to 1), the corresponding cross-component filter coefficient has a negative value.

FIG. 13

When alf_cc_cr_coeff_sign[ k ][ j ] is not present, it is inferred to be equal to 0.

The signalled k-th cross-component filter coefficients for the Cr colour component CcAlfApsCoeff[ aps_adaptation_parameter_set_id ][ k ][ j ], with j = 0..6 are derived as follows:

~~If alf_cc_cr_mapped_coeff_abs[ k ][ j ] is equal to 0,~~
~~CcAlfApsCoeff[ aps_adaptation_parameter_set_id ][ k ][ j ] is set equal to 0.~~

~~Otherwise, CcAlfApsCoeff[ aps_adaptation_parameter_set_id ][ k ][ j ] is set equal to~~
~~( 1 − 2 * alf_cc_cr_coeff_sign[ k ][ j ] ) * 2^(alf_cc_cr_mapped_coeff_abs[ k ][ j ] − 1).~~

CcAlfApsCoeff[ aps_adaptation_parameter_set_id ][ k ][ j ] =

( 1 − 2 * alf_cc_cr_coeff_sign[ k ][ j ] ) * alf_cc_cr_coeff_abs[ k ][ j ]

Exemplary APS syntax table of the proposed method

| alf_data( ) { | Descriptor |
|---|---|
| if( alf_cc_cb_filter_signal_flag ) { | |
|   alf_cc_cb_filters_signalled_minus1 | ue(v) |
|   for( k = 0; k < alf_cc_cb_filters_signalled_minus1 + 1; k++ ) { | |
|     for( j = 0; j < 7; j++ ) { | |
|       alf_cc_cb_~~mapped~~_coeff_abs[ k ][ j ] | ~~u(3)~~ ue(v) |
|       if( alf_cc_cb_~~mapped~~_coeff_abs[ k ][ j ] ) | |
|         alf_cc_cb_coeff_sign[ k ][ j ] | u(1) |
|       } | |
|     } | |
|   } | |
| } | |
| if( alf_cc_cr_filter_signal_flag ) { | |
|   alf_cc_cr_filters_signalled_minus1 | ue(v) |
|   for( k = 0; k < alf_cc_cr_filters_signalled_minus1 + 1; k++ ) { | |
|     for( j = 0; j < 7; j++ ) { | |
|       alf_cc_cr_~~mapped~~_coeff_abs[ k ][ j ] | ~~u(3)~~ ue(v) |
|       if( alf_cc_cr_~~mapped~~_coeff_abs[ k ][ j ] ) | |
|         alf_cc_cr_coeff_sign[ k ][ j ] | u(1) |
|       } | |
|     } | |
|   } | |
| } | |
| } | |

Signaling of the filter coefficients of each class

| alf_data( ) { | Descriptor |
|---|---|
|   if( alf_cc_cb_filter_signal_flag ) { | |
|     alf_cc_cb_filters_signalled_minus1 | ue(v) |
|     for( k = 0; k <= alf_cc_cb_filters_signalled_minus1 + 1; k++ ) { | |
|       for( classIdx = 0; classIdx < 15; classIdx ++ ) { | |
|         for( j = 0; j < 7; j++ ) { | |
|           alf_cc_cb_mapped_coeff_abs[ k ][ classIdx ][ j ] | u(3) |
|           if( alf_cc_cb_mapped_coeff_abs[ k ][ classIdx ][ j ] ) | |
|             alf_cc_cb_coeff_sign[ k ][ classIdx ][ j ] | u(1) |
|         } | |
|       } | |
|     } | |
|   } | |
|   if( alf_cc_cr_filter_signal_flag ) { | |
|     alf_cc_cr_filters_signalled_minus1 | ue(v) |
|     for( k = 0; k <= alf_cc_cr_filters_signalled_minus1 + 1; k++ ) { | |
|       for( classIdx = 0; classIdx < 15; classIdx ++ ) { | |
|         for( j = 0; j < 7; j++ ) { | |
|           alf_cc_cr_mapped_coeff_abs[ k ][ classIdx ][ j ] | u(3) |
|           if( alf_cc_cr_mapped_coeff_abs[ k ][ classIdx ][ j ] ) | |
|             alf_cc_cr_coeff_sign[ k ][ classIdx ][ j ] | u(1) |
|         } | |
|       } | |
|     } | |
|   } | |
| } | |

1810 (top block), 1820 (bottom block)

FIG. 18 alf_cc_cb_filters_signalled_minus1 plus 1 specifies the number of cross-component filters for the Cb colour component signalled in the current ALF APS. The value of alf_cc_cb_filters_signalled_minus1 shall be in the range of 0 to 3, inclusive.

alf_cc_cb_mapped_coeff_abs[ k ][c][ j ] specifies the absolute value of the j-th mapped coefficient *of c- th class of the* signalled k-th cross-component filter for the Cb colour component. When alf_cc_cb_mapped_coeff_abs[ k ][c][ j ] is not present, it is inferred to be equal to 0.

alf_cc_cb_coeff_sign[ k ][c][ j ] specifies the sign of the j-th coefficient of the of *c- th class of the signalled k-th* cross-component filter for the Cb colour component as follows:

- If alf_cc_cb_coeff_sign[ k ][c][ j ] is equal to 0, the corresponding cross-component filter coefficient has a positive value.

- Otherwise (alf_cc_cb_sign[ k ][c][ j ] is equal to 1), the corresponding cross-component filter coefficient has a negative value.

When alf_cc_cb_coeff_sign[ k ][c][ j ] is not present, it is inferred to be equal to 0.

The signalled k-th cross-component filter coefficients for the Cb colour component CcAlfApsCoeff$_{Cb}$[ aps_adaptation_parameter_set_id ][ k ][c][ j ], with $c = 0...14$, $j = 0..6$ are derived as follows:

- If alf_cc_cb_mapped_coeff_abs[ k ][c][ j ] is equal to 0, CcAlfApsCoeff$_{Cb}$[ aps_adaptation_parameter_set_id ][ k ][c][ j ] is set equal to 0.

- Otherwise, CcAlfApsCoeff$_{Cb}$[ aps_adaptation_parameter_set_id ][ k ][c][ j ] is set equal to ( 1 − 2 * alf_cc_cb_coeff_sign[ k ][c][ j ] ) * $2^{\text{alf\_cc\_cb\_mapped\_coeff\_abs}[ k ][c][ j ] - 1}$.

alf_cc_cr_filters_signalled_minus1 plus 1 specifies the number of cross-component filters for the Cr colour component signalled in the current ALF APS. The value of alf_cc_cr_filters_signalled_minus1 shall be in the range of 0 to 3, inclusive.

alf_cc_cr_mapped_coeff_abs[ k ][c][ j ] specifies the absolute value of the j-th mapped coefficient *of the c-th class of the* signalled k-th cross-component filter for the Cr colour component. When alf_cc_cr_mapped_coeff_abs[ k ][c][ j ] is not present, it is inferred to be equal to 0.

FIG. 19 alf_cc_cr_coeff_sign[ k ][c][ j ] specifies the sign of the j-th coefficient of the *c-th class of the* signalled k-th cross-component filter for the Cr colour component as follows:

- If alf_cc_cr_coeff_sign[ k ] *[c]* [ j ] is equal to 0, the corresponding cross-component filter coefficient has a positive value.

- Otherwise (alf_cc_cr_sign[ k ] *[c]* [ j ] is equal to 1), the corresponding cross-component filter coefficient has a negative value.

When alf_cc_cr_coeff_sign[ k ] *[c]* [ j ] is not present, it is inferred to be equal to 0.

The signalled k-th cross-component filter coefficients for the Cr colour component CcAlfApsCoeff$_{Cr}$[ aps_adaptation_parameter_set_id ][ k ] *[c]* [ j ], with $c = 0 \ldots 14$ *and* $j = 0..6$ are derived as follows:

- If alf_cc_cr_mapped_coeff_abs[ k ] *[c]* [ j ] is equal to 0, CcAlfApsCoeff$_{Cr}$[ aps_adaptation_parameter_set_id ][ k ] *[c]* [ j ] is set equal to 0.
  Otherwise, CcAlfApsCoeff$_{Cr}$[ aps_adaptation_parameter_set_id ] *[c]* [ k ][ j ] is set equal to
  ( 1 − 2 * alf_cc_cr_coeff_sign[ k ] *[c]* [ j ] ) * $2^{\text{alf\_cc\_cr\_mapped\_coeff\_abs}[ k ] [c] [ j ] - 1}$.

FIG. 19 (continued)

- For every coding tree unit with luma coding tree block location (rx, ry), where rx = 0..PicWidthInCtbsY − 1 and ry = 0..PicHeightInCtbsY − 1, the following applies:

- When sps_chroma_format_idc is not equal to 0 and alf_ctb_cc_cb_idc[ rx ][ ry ] is not equal to 0, the cross-component filtering process as specified in clause 8.8.5.7 is invoked with recPicture$_L$ set equal to recPicture$_L$, alfPicture$_C$ set equal to alfPicture$_{Cb}$, the chroma coding tree block location ( xCtbC, yCtbC ) set equal to ( ( rx << CtbLog2SizeY ) / SubWidthC, ( ry << CtbLog2SizeY ) / SubHeightC ), ccAlfWidth set equal to ( 1 << CtbLog2SizeY ) / SubWidthC, ccAlfHeight set equal to ( 1 << CtbLog2SizeY ) / SubHeightC, and the cross-component filter coefficients CcAlfCoeff[ c ][ j ] set equal to CcAlfApsCoeff$_{Cb}$[ sh_alf_cc_cb_aps_id ][ alf_ctb_cc_cb_idc[ rx ][ ry ] − 1 ][ c ][ j ], with c = 0 to 14 and j = 0..6, as inputs, and the output is the modified filtered picture ccAlfPicture$_{Cb}$.

- When sps_chroma_format_idc is not equal to 0 and alf_ctb_cc_cr_idc[ rx ][ ry ] is not equal to 0, the cross-component filtering process as specified in clause 8.8.5.7 is invoked with recPicture$_L$ set equal to recPicture$_L$, alfPicture$_C$ set equal to alfPicture$_{Cr}$, the chroma coding tree block location ( xCtbC, yCtbC ) set equal to ( ( rx << CtbLog2SizeY ) / SubWidthC, ( ry << CtbLog2SizeY ) / SubHeightC ), ccAlfWidth set equal to ( 1 << CtbLog2SizeY ) / SubWidthC, ccAlfHeight set equal to ( 1 << CtbLog2SizeY ) / SubHeightC, and the cross-component filter coefficients CcAlfCoeff[ c ][ j ] set equal to CcAlfApsCoeff$_{Cr}$[ sh_alf_cc_cr_aps_id ][ alf_ctb_cc_cr_idc[ rx ][ ry ] − 1 ][ c ][ j ], with c = 0…14 and j = 0..6, as inputs, and the output is the modified filtered picture ccAlfPicture$_{Cr}$.

Cross-component filtering process

Inputs of this process are:

- a reconstructed luma picture sample array recPicture$_L$ prior to the luma adaptive loop filtering process,

- a filtered reconstructed chroma picture sample array alfPicture$_C$,

- a chroma location ( xCtbC, yCtbC ) specifying the top-left sample of the current chroma coding tree block relative to the top-left sample of the current picture,

- a CTB width ccAlfWidth in chroma samples,

- a CTB height ccAlfHeight in chroma samples,

- *a class index array classIdx where each element represent the classification index of the corresponding luma sample*

- cross-component filter coefficients CcAlfCoeff[ c ][ j ], with c = 0…14 and j = 0..6.

Output of this process is the modified filtered reconstructed chroma picture sample array ccAlfPicture.

FIG. 20

For the derivation of the filtered reconstructed chroma samples ccAlfPicture[ xCtbC + x ][ yCtbC + y ], each reconstructed chroma sample inside the current chroma block of samples alfPicture_C[ xCtbC + x ][ yCtbC + y ] with x = 0..ccAlfWidth − 1, y = 0..ccAlfHeight − 1, is filtered as follows:

- The luma location ( xL, yL ) corresponding to the current chroma sample at chroma location ( xCtbC + x, yCtbC + y ) is set equal to ( ( xCtbC + x ) * SubWidthC, ( yCtbC + y ) * SubHeightC ).
- The variables clipLeftPos, clipRightPos, clipTopPos, clipBottomPos, clipTopLeftFlag and clipBotRightFlag are derived by invoking the ALF boundary position derivation process as specified in clause 8.8.5.5 with ( xCtbC * SubWidthC, yCtbC * SubHeightC ), ( x * SubWidthC, y * SubHeightC ) and the variable vbOffset set equal to 4 as inputs.
- The luma locations ( $h_{x+i, y+j}$, $v_{y+j}$ ) with i = −1..1, j = −1..2 inside the array recPicture$_L$ are derived as follows:

$$h_{x+i, y+j} = Clip3( 0, pps\_pic\_width\_in\_luma\_samples - 1, xL + i )$$ (1499)

$$v_{y+j} = Clip3( 0, pps\_pic\_height\_in\_luma\_samples - 1, yL + j )$$ (1500)

- The location ( $h_{x+i, y+j}$, $v_{y+j}$ ) is modified by invoking the ALF sample padding process as specified in clause 8.8.5.6 with ( xCtbC * SubWidthC, yCtbC * SubHeightC ), ( $h_{x+i, y+j}$, $v_{y+j}$ ), the variable isChroma set equal to 0, clipLeftPos, clipRightPos, clipTopPos, clipBottomPos, clipTopLeftFlag and clipBotRightFlag as input.

- The variable applyAlfLineBufBoundary is derived as follows:

- If the bottom boundary of the current coding tree block is the bottom boundary of current picture and pps_pic_height_in_luma_samples − yCtbC * SubHeightC is less then or equal to CtbSizeY − 4, applyAlfLineBufBoundary is set equal to 0.
    - Otherwise, applyAlfLineBufBoundary is set equal to 1.

- The vertical sample position offsets yP1 and yP2 are specified in Table 47 according to the vertical luma sample position (y * subHeightC ) and applyAlfLineBufBoundary.
- The variable curr is derived as follows:

$$curr = alfPicture_C[ xCtbC + x ][ yCtbC + y ]$$ (1501)

- *The variable c is derived as follows:*

$$c = classIdx\ [(xCtbC + x) * SubWidthC][(yCtbC + y) * SubHeightC]$$

- The array of cross-component filter coefficients f[ j ] is derived as follows with j = 0..6:

$$f[ j ] = CcAlfCoeff[c][ j ]$$ (1502)

FIG. 20 (Continued)

- The variable sum is derived as follows:

sum =   f[ 0 ] * ( recPicture₁[ h$_{x, y - yP1}$ ][ v$_y - yP1$ ] − recPicture₁[ h$_{x, y}$ ][ v$_y$ ] ) +
          f[ 1 ] * ( recPicture₁[ h$_{x - 1, y}$ ][ v$_y$ ] − recPicture₁[ h$_{x, y}$ ][ v$_y$ ] ) +
          f[ 2 ] * ( recPicture₁[ h$_{x + 1, y}$ ][ v$_y$ ] − recPicture₁[ h$_{x, y}$ ][ v$_y$ ] ) +
          f[ 3 ] * ( recPicture₁[ h$_{x - 1, y + yP1}$ ][ v$_{y + yP1}$ ] − recPicture₁[ h$_{x, y}$ ][ v$_y$ ] ) +
          f[ 4 ] * ( recPicture₁[ h$_{x, y + yP1}$ ][ v$_{y + yP1}$ ] − recPicture₁[ h$_{x, y}$ ][ v$_y$ ] ) +
          f[ 5 ] * ( recPicture₁[ h$_{x + 1, y + yP1}$ ][ v$_{y + yP1}$ ] − recPicture₁[ h$_{x, y}$ ][ v$_y$ ] ) +
          f[ 6 ] * ( recPicture₁[ h$_{x, y + yP2}$ ][ v$_{y + yP2}$ ] − recPicture₁[ h$_{x, y}$ ][ v$_y$ ] )

scaledSum = Clip3( −( 1 << ( BitDepth − 1 ) ), ( 1 << ( BitDepth − 1 ) ) − 1, ( sum + 64 ) >> 7 )   (1504)

sum = ( SubHeightC == 1 && ( y == CtbSizeY − 3 || y == CtbSizeY − 4 ) ) ?
        curr : curr + scaledSum   (1505)

- The modified filtered reconstructed chroma picture sample ccAlfPicture[ xCtbC + x ][ yCtbC + y ] is derived as follows:

ccAlfPicture[ xCtbC + x ][ yCtbC + y ] = Clip3( 0, ( 1 << BitDepth ) − 1, sum )   (1506)

FIG. 20 (Continued)

APS syntax of the proposed method

| alf_data( ) { | Descriptor |
|---|---|
|   if( alf_cc_cb_filter_signal_flag ) { | |
|     alf_cc_cb_filters_signalled_minus1 | ue(v) |
|     for( k = 0; k < alf_cc_cb_filters_signalled_minus1 + 1; k++ ) { | |
|       *alf_cc_cb_number_of_merged_class* | *ue(v)* |
|       *for( classIdx = 0; classIdx < alf_cc_cb_number_of_merged_class; classIdx ++ ) {* | |
|         for( j = 0; j < 7; j++ ) { | |
|           alf_cc_cb_mapped_coeff_abs[ k ][ *classIdx* ][ j ] | u(3) |
|           if( alf_cc_cb_mapped_coeff_abs[ k ][ *classIdx* ][ j ] ) | |
|             alf_cc_cb_coeff_sign[ k ][ *classIdx* ][ j ] | u(1) |
|         } | |
|       } | |
|       *for( classIdx = 0; classIdx < 15; classIdx ++ ) {* | |
|         *alf_cc_cb_merge_index_array[classIdx]* | *ue(v)* |
|     } | |
|   } | |
|   if( alf_cc_cr_filter_signal_flag ) { | |
|     alf_cc_cr_filters_signalled_minus1 | ue(v) |
|     for( k = 0; k < alf_cc_cr_filters_signalled_minus1 + 1; k++ ) { | |
|       *alf_cc_cr_number_of_merged_class* | *ue(v)* |
|       *for( classIdx = 0; classIdx < alf_cc_cr_number_of_merged_class; classIdx ++ ) {* | |
|         for( j = 0; j < 7; j++ ) { | |
|           alf_cc_cr_mapped_coeff_abs[ k ][ *classIdx* ][ j ] | u(3) |
|           if( alf_cc_cr_mapped_coeff_abs[ k ][ *classIdx* ][ j ] ) | |
|             alf_cc_cr_coeff_sign[ k ][ *classIdx* ][ j ] | u(1) |
|         } | |
|       } | |
|       *for( classIdx = 0; classIdx < 15; classIdx ++ ) {* | |
|         *alf_cc_cr_merge_index_array[classIdx]* | *ue(v)* |
|     } | |
|   } | |
| } | |

2210 (first inner block), 2220 (second inner block)

FIG. 22 alf_cc_cb_filters_signalled_minus1 plus 1 specifies the number of cross-component filters for the Cb colour component signalled in the current ALF APS. The value of alf_cc_cb_filters_signalled_minus1 shall be in the range of 0 to 3, inclusive.

alf_cc_cb_mapped_coeff_abs[ k ] *[c]* [ j ] specifies the absolute value of the j-th mapped coefficient *of c- th merged class of the* signalled k-th cross-component filter for the Cb colour component. When alf_cc_cb_mapped_coeff_abs[ k ] *[c]* [ j ] is not present, it is inferred to be equal to 0.

alf_cc_cb_coeff_sign[ k ] *[c]* [ j ] specifies the sign of the j-th coefficient of the of c- *th merged class of the signalled k-th* cross-component filter for the Cb colour component as follows:

- If alf_cc_cb_coeff_sign[ k ] *[c]* [ j ] is equal to 0, the corresponding cross-component filter coefficient has a positive value.

- Otherwise (alf_cc_cb_sign[ k ] *[c]* [ j ] is equal to 1), the corresponding cross-component filter coefficient has a negative value.

When alf_cc_cb_coeff_sign[ k ] *[c]* [ j ] is not present, it is inferred to be equal to 0.

The signalled k-th cross-component filter coefficients for the Cb colour component CcAlfApsCoeff$_{Cb}$[ aps_adaptation_parameter_set_id ][ k ] *[c]* [ j ], with c = 0...14, j = 0..6 are derived as follows:

- If alf_cc_cb_mapped_coeff_abs[ k ] *[alf_cc_cb_merge_index_array[c]]* [ j ] is equal to 0, CcAlfApsCoeff$_{Cb}$[ aps_adaptation_parameter_set_id ][ k ] [ c ] [ j ] is set equal to 0.

- Otherwise, CcAlfApsCoeff$_{Cb}$[ aps_adaptation_parameter_set_id ][ k ] *[c]* [ j ] is set equal to ( 1 − 2 * alf_cc_cb_coeff_sign[ k ] *[alf_cc_cb_merge_index_array[c]]* [ j ] ) * $2^{alf\_cc\_cb\_mapped\_coeff\_abs[k] [alf\_cc\_cb\_merge\_index\_array[c]] [j] - 1}$

FIG. 23 alf_cc_cr_filters_signalled_minus1 plus 1 specifies the number of cross-component filters for the Cr colour component signalled in the current ALF APS. The value of alf_cc_cr_filters_signalled_minus1 shall be in the range of 0 to 3, inclusive.

alf_cc_cr_mapped coeff_abs[ k ][c][ j ] specifies the absolute value of the j-th mapped coefficient *of the c-th mered class of the* signalled k-th cross-component filter for the Cr colour component. When alf_cc_cr_mapped coeff_abs[ k ][c][ j ] is not present, it is inferred to be equal to 0.

alf_cc_cr_coeff_sign[ k ][c][ j ] specifies the sign of the j-th coefficient of the *c-th class of the* signalled k-th cross-component filter for the Cr colour component as follows:

- If alf_cc_cr_coeff_sign[ k ] [c] [ j ] is equal to 0, the corresponding cross-component filter coefficient has a positive value.

- Otherwise (alf_cc_cr_sign[ k ] [c] [ j ] is equal to 1), the corresponding cross-component filter coefficient has a negative value.

When alf_cc_cr_coeff_sign[ k ] [c] [ j ] is not present, it is inferred to be equal to 0.

The signalled k-th cross-component filter coefficients for the Cr colour component CcAlfApsCoeffCr[ aps_adaptation_parameter_set_id ][ k ] [c] [ j ], with $c = 0 \ldots 14$ and $j = 0..6$ are derived as follows:

- If alf_cc_cr_mapped_coeff_abs[ k ] [[alf_cc_cr_merge_index_array[c]]] [ j ] is equal to 0, CcAlfApsCoeffCr[ aps_adaptation_parameter_set_id ][ k ] [c] [ j ] is set equal to 0.

- Otherwise, CcAlfApsCoeffCr[ aps_adaptation_parameter_set_id ] [c][ k ][ j ] is set equal to ( 1 − 2 * alf_cc_cr_coeff_sign[ k ] [[alf_cc_cr_merge_index_array[c]]] [ j ] ) * $2^{alf\_cc\_cr\_mapped\_coeff\_abs[ k ] [[alf\_cc\_cr\_merge\_index\_array[c]]] [ j ] - 1}$.

FIG. 23 (continued)

Cross-component filtering process

Inputs of this process are:

- a reconstructed luma picture sample array recPicture$_L$ prior to the luma adaptive loop filtering process,
- a filtered reconstructed chroma picture sample array alfPicture$_C$,
- a chroma location ( xCtbC, yCtbC ) specifying the top-left sample of the current chroma coding tree block relative to the top-left sample of the current picture,
- a CTB width ccAlfWidth in chroma samples,
- a CTB height ccAlfHeight in chroma samples,
- cross-component filter coefficients CcAlfCoeff[ j ], with j = 0.. *23* 6.                                    2510

Output of this process is the modified filtered reconstructed chroma picture sample array ccAlfPicture.

For the derivation of the filtered reconstructed chroma samples ccAlfPicture[ xCtbC + x ][ yCtbC + y ], each reconstructed chroma sample inside the current chroma block of samples alfPicture$_C$[ xCtbC + x ][ yCtbC + y ] with x = 0..ccAlfWidth − 1, y = 0..ccAlfHeight − 1, is filtered as follows:

- The luma location ( xL, yL ) corresponding to the current chroma sample at chroma location ( xCtbC + x, yCtbC + y ) is set equal to ( ( xCtbC + x ) * SubWidthC, ( yCtbC + y ) * SubHeightC ).

.....

- The variable curr is derived as follows:

curr = alfPicture$_C$[ xCtbC + x ][ yCtbC + y ]
          (1501)

- The array of cross-component filter coefficients f[ j ] is derived as follows with j = 0..6:

f[ j ] = CcAlfCoeff[ j ]                                                      (1502)

- *The variable sum is derived as follows:*
  ~~sum = f[ 0 ] * ( recPicture$_L$[ h$_x$, y$_L$ + y$_{P1}$ ][ v$_y$, y$_L$ ] − recPicture$_L$[ h$_x$, y$_L$ ][ v$_y$, y$_L$ ] ) +~~
  ~~f[ 1 ] * ( recPicture$_L$[ h$_x$ − 1, y$_L$ ][ v$_y$, y$_L$ ] − recPicture$_L$[ h$_x$, y$_L$ ][ v$_y$, y$_L$ ] ) +~~
  ~~f[ 2 ] * ( recPicture$_L$[ h$_x$ + 1, y$_L$ ][ v$_y$, y$_L$ ] − recPicture$_L$[ h$_x$, y$_L$ ][ v$_y$, y$_L$ ] ) +~~
  ~~f[ 3 ] * ( recPicture$_L$[ h$_x$ − 1, y$_L$ + p1 ][ v$_y$, y$_L$ ] − recPicture$_L$[ h$_x$, y$_L$ ][ v$_y$, y$_L$ ] ) +~~
  ~~f[ 4 ] * ( recPicture$_L$[ h$_x$, y$_L$ + p1 ][ v$_y$, y$_L$ ] − recPicture$_L$[ h$_x$, y$_L$ ][ v$_y$, y$_L$ ] ) +~~
  ~~f[ 5 ] * ( recPicture$_L$[ h$_x$ + 1, y$_L$ + p1 ][ v$_y$, y$_L$ ] − recPicture$_L$[ h$_x$, y$_L$ ][ v$_y$, y$_L$ ] ) +~~
  ~~f[ 6 ] * ( recPicture$_L$[ h$_x$, y$_L$ + p2 ][ v$_y$, y$_L$ ] − recPicture$_L$[ h$_x$, y$_L$ ][ v$_y$, y$_L$ ] )~~

FIG. 25

$$\text{sum} = f[0] * (recPicture_L[h_{x,y-yP4}][v_{y-yP4}] - recPicture_L[h_{x,y}][v_y])$$
$$+ f[1] * (recPicture_L[h_{x,y-yP3}][v_{y-yP3}] - recPicture_L[h_{x,y}][v_y]) +$$
$$f[2] * (recPicture_L[h_{x,y-yP2}][v_{y-yP2}] - recPicture_L[h_{x,y}][v_y]) +$$
$$f[3] * (recPicture_L[h_{x,y-yP1}][v_{y-yP1}] - recPicture_L[h_{x,y}][v_y]) +$$
$$f[4] * (recPicture_L[h_{x-4,y}][v_y] - recPicture_L[h_{x,y}][v_y]) +$$
$$f[5] * (recPicture_L[h_{x-3,y}][v_y] - recPicture_L[h_{x,y}][v_y]) +$$
$$f[6] * (recPicture_L[h_{x-2,y}][v_y] - recPicture_L[h_{x,y}][v_y]) +$$
$$f[7] * (recPicture_L[h_{x-1,y}][v_y] - recPicture_L[h_{x,y}][v_y]) +$$
$$f[8] * (recPicture_L[h_{x+1,y}][v_y] - recPicture_L[h_{x,y}][v_y]) +$$
$$f[9] * (recPicture_L[h_{x+2,y}][v_y] - recPicture_L[h_{x,y}][v_y]) +$$
$$f[10] * (recPicture_L[h_{x+3,y}][v_y] - recPicture_L[h_{x,y}][v_y]) +$$
$$f[11] * (recPicture_L[h_{x+4,y}][v_y] - recPicture_L[h_{x,y}][v_y]) +$$
$$f[12] * (recPicture_L[h_{x-4,y+yP1}][v_{y+yP1}] - recPicture_L[h_{x,y}][v_y]) +$$
$$f[13] * (recPicture_L[h_{x-3,y+yP1}][v_{y+yP1}] - recPicture_L[h_{x,y}][v_y]) +$$
$$f[14] * (recPicture_L[h_{x-2,y+yP1}][v_{y+yP1}] - recPicture_L[h_{x,y}][v_y]) +$$
$$f[15] * (recPicture_L[h_{x-1,y+yP1}][v_{y+yP1}] - recPicture_L[h_{x,y}][v_y]) +$$
$$f[16] * (recPicture_L[h_{x,y+yP1}][v_{y+yP1}] - recPicture_L[h_{x,y}][v_y]) +$$
$$f[17] * (recPicture_L[h_{x+1,y+yP1}][v_{y+yP1}] - recPicture_L[h_{x,y}][v_y]) +$$
$$f[18] * (recPicture_L[h_{x+2,y+yP1}][v_{y+yP1}] - recPicture_L[h_{x,y}][v_y]) +$$
$$f[19] * (recPicture_L[h_{x+3,y+yP1}][v_{y+yP1}] - recPicture_L[h_{x,y}][v_y]) +$$
$$f[20] * (recPicture_L[h_{x+4,y+yP1}][v_{y+yP1}] - recPicture_L[h_{x,y}][v_y]) +$$
$$f[21] * (recPicture_L[h_{x,y+yP2}][v_{y+yP2}] - recPicture_L[h_{x,y}][v_y]) +$$
$$f[22] * (recPicture_L[h_{x,y+yP3}][v_{y+yP3}] - recPicture_L[h_{x,y}][v_y]) +$$
$$f[23] * (recPicture_L[h_{x,y+yP4}][v_{y+yP4}] - recPicture_L[h_{x,y}][v_y]) +$$

2520 scaledSum = Clip3( −( 1 << ( BitDepth − 1 ) ), ( 1 << ( BitDepth − 1 ) ) − 1, ( sum + 64 ) >> 7 )   (1504)

sum = curr + scaledSum   (1505)

– The modified filtered reconstructed chroma picture sample ccAlfPicture[ xCtbC + x ][ yCtbC + y ] is derived as follows:

ccAlfPicture[ xCtbC + x ][ yCtbC + y ] = Clip3( 0, ( 1 << BitDepth ) − 1, sum )
(1506)

FIG. 25 (Continued)

Exemplary picture header syntax structure for signaling predictor palette initializer

| picture_header_rbsp( ) { | Descriptor |
|---|---|
| ... | |
| if( sps_palette_enabled_flag ) { | |
|   predictor_palette_initializer_present_flag | u(1) |
|   if( predictor_palette_initializer_present_flag ) | |
|     predictor_palette_initializer() | |
| } | |
| ... | |

METHODS AND SYSTEMS FOR CROSS-COMPONENT ADAPTIVE LOOP FILTER

CROSS-REFERENCE TO RELATED APPLICATIONS

The disclosure claims the benefits of priority to U.S. Provisional Application No. 63/215,521, filed on Jun. 28, 2021, and U.S. Provisional Application No. 63/235,111, filed on Aug. 19, 2021, both of which are incorporated herein by reference in their entireties.

TECHNICAL FIELD

The present disclosure generally relates to video processing, and more particularly, to methods and systems for cross component loop adaptive filter of video coding.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for video processing using Cross-Component Adaptive Loop Filter (CCALF). The method includes filtering decoded video content using a CCALF, wherein the CCALF is a 24-tap 9×9 filter.

Embodiments of the present disclosure provide a method for video processing using Cross-Component Adaptive Loop Filter (CCALF). The method includes filtering video content using a CCALF, wherein the CCALF is a 24-tap 9×9 filter.

Embodiments of the present disclosure provide a non-transitory computer readable medium storing a bitstream. The bitstream includes a first index associated with encoded video data, the first index identifying a Cross-Component Adaptive Loop Filter (CCALF), wherein the CCALF is a 24-tap 9×9 filter, and the first index causes a decoder to filter decoded video content using the 24-tap 9×9 filter.

BRIEF DESCRIPTION OF THE DRAWINGS

Embodiments and various aspects of the present disclosure are illustrated in the following detailed description and the accompanying figures. Various features shown in the figures are not drawn to scale.

FIG. 10 shows an exemplary semantics for updated CCALF-related syntax elements, according to some embodiments of the present disclosure.

FIG. 11 shows an exemplary Adaptive Loop Filter (ALF) signaled in adaptation parameter sets (APS) syntax, according to some embodiments of the present disclosure.

FIG. 12 shows an exemplary updated VVC specification for CCALF process, according to some embodiments of the present disclosure.

FIG. 13 shows exemplary changes of CCALF-related semantics, according to some embodiments of the present disclosure.

FIG. 14 shows an exemplary APS syntax table, according to some embodiments of the present disclosure.

FIG. 18 shows an example of the APS syntax to signal the filter coefficients for one or more CCALF classes, according to some embodiments of the present disclosure.

FIG. 19 shows exemplary semantic changes, according to some embodiments of the present disclosure.

FIG. 20 shows an exemplary updated VVC specification, according to some embodiments of the present disclosure.

FIG. 22 shows APS syntax of the method for signaling filter coefficients using class merging, according to some embodiments of the present disclosure.

FIG. 23 shows exemplary semantic changes, according to some embodiments of the present disclosure.

FIG. 25 shows an exemplary updated VVC specification of the CCALF process using the filter shown in FIG. 24, according to some embodiments of the present disclosure.

FIG. 28 shows an exemplary APS syntax table, according to some embodiments of the present disclosure.

DETAILED DESCRIPTION

Figure 1:
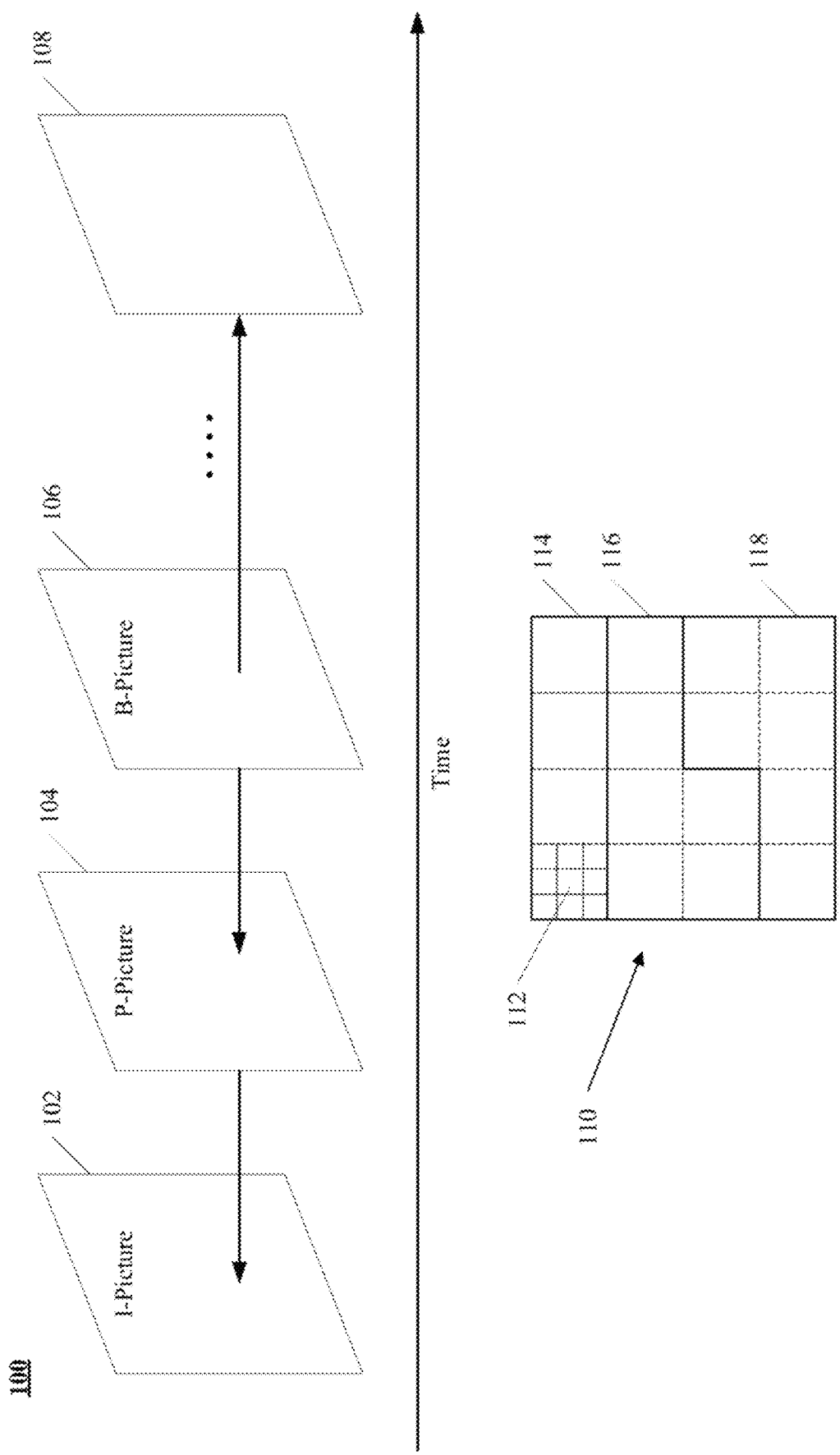
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC).

A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
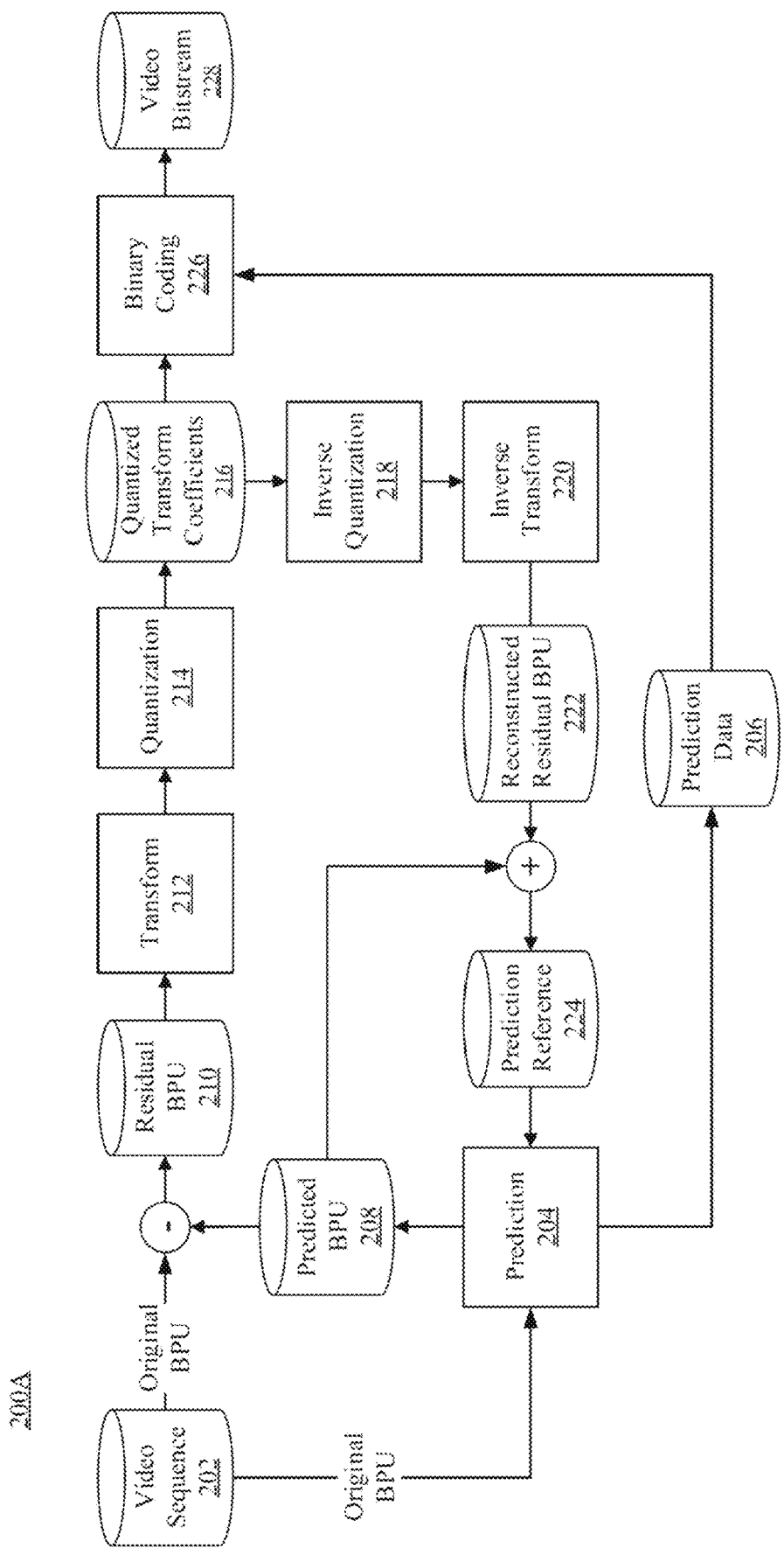
FIG. 2A is a schematic diagram illustrating an exemplary encoding process of a hybrid video coding system, consistent with embodiments of the disclosure.
Figure 2B:
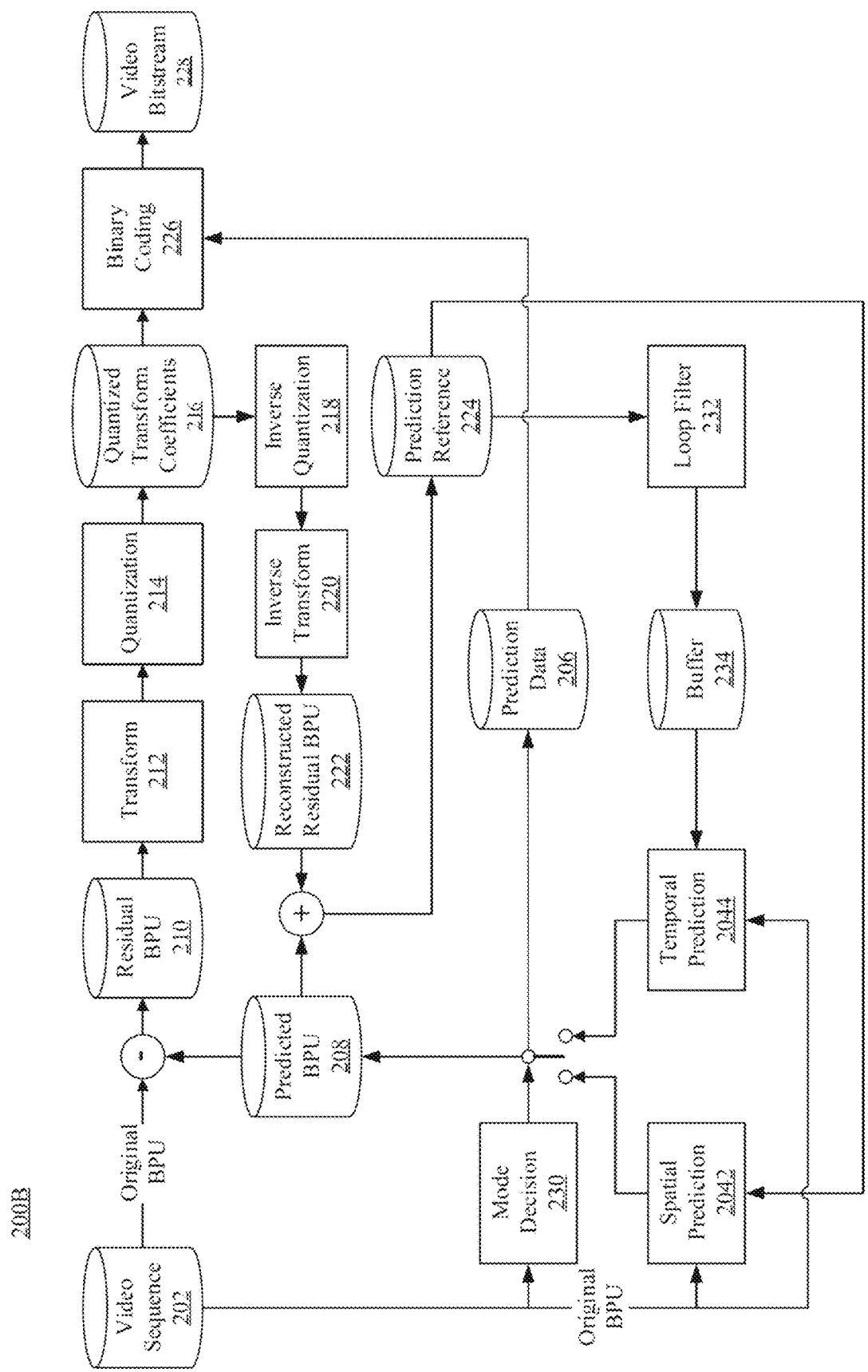
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets (SAO), adaptive loop filters (ALF), or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
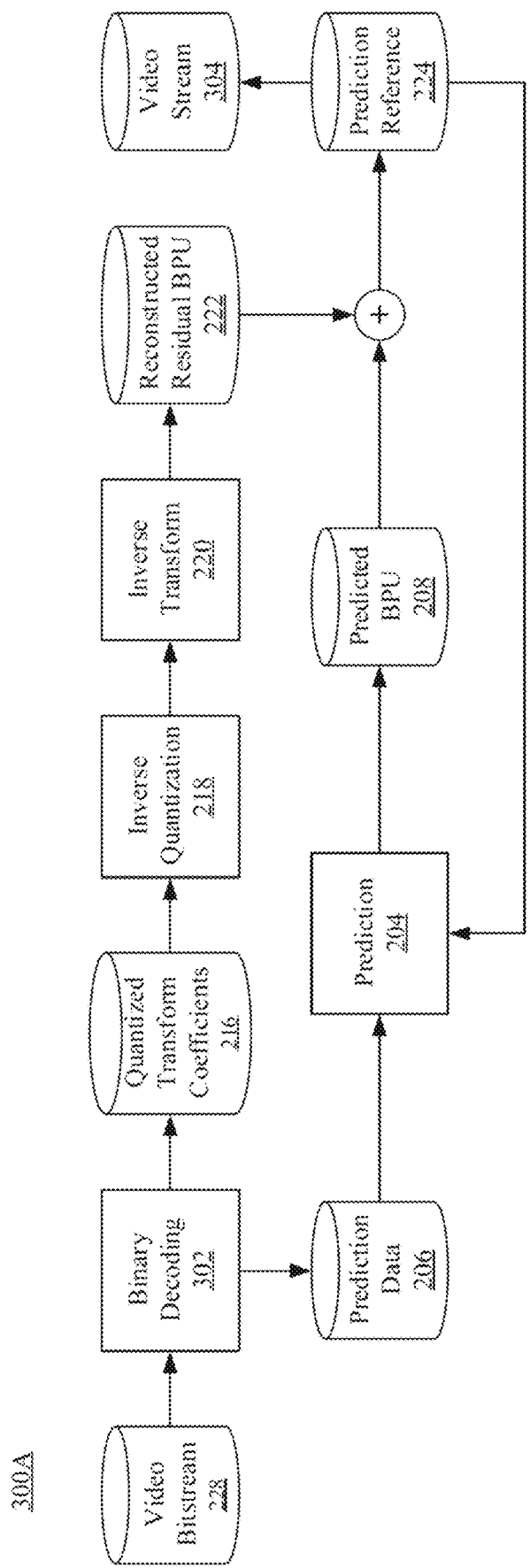
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
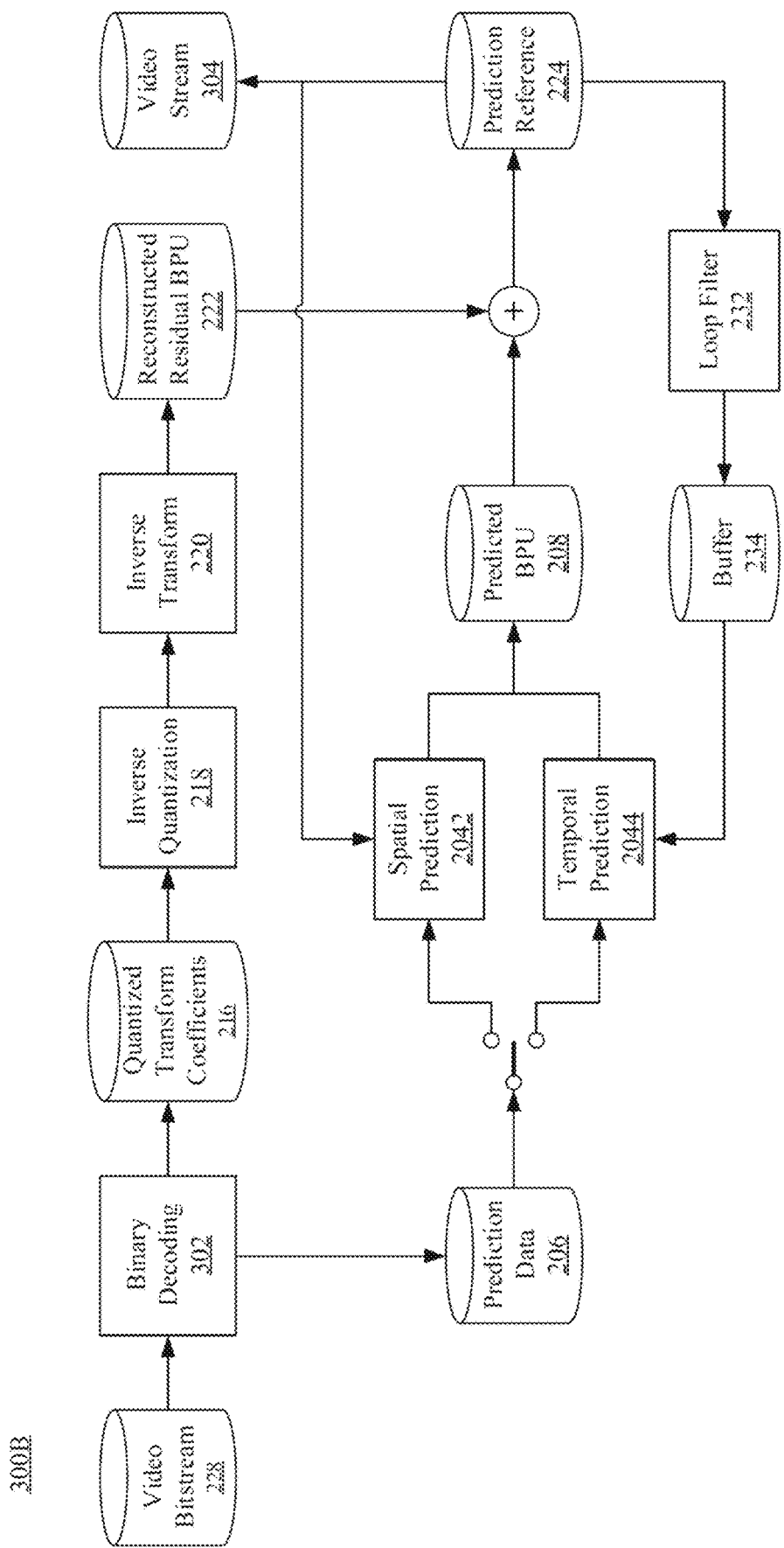
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
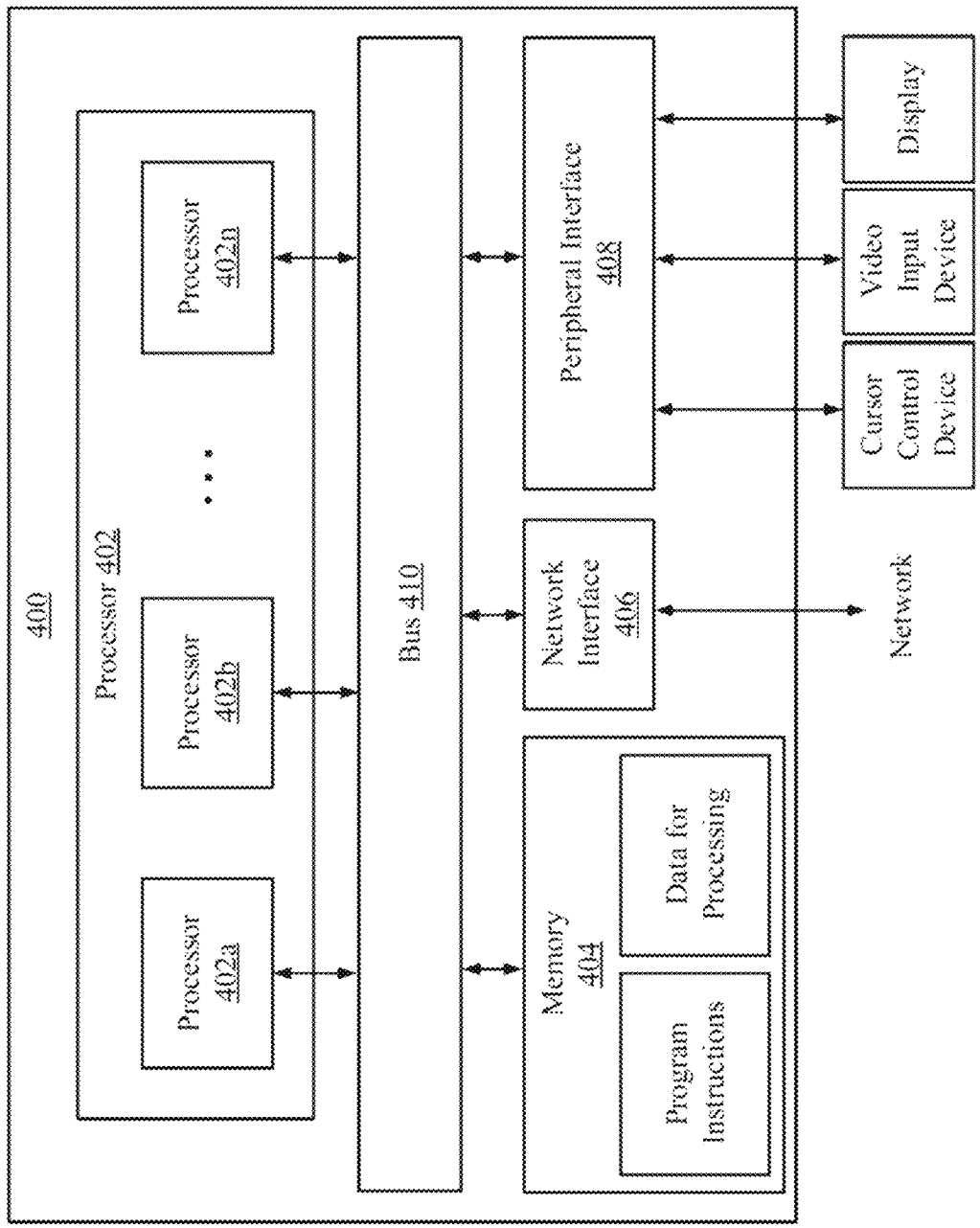
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

The present disclosure provides methods for signaling and deriving parameters associated with a cross component adaptive loop filter (CCALF).

Figure 5:
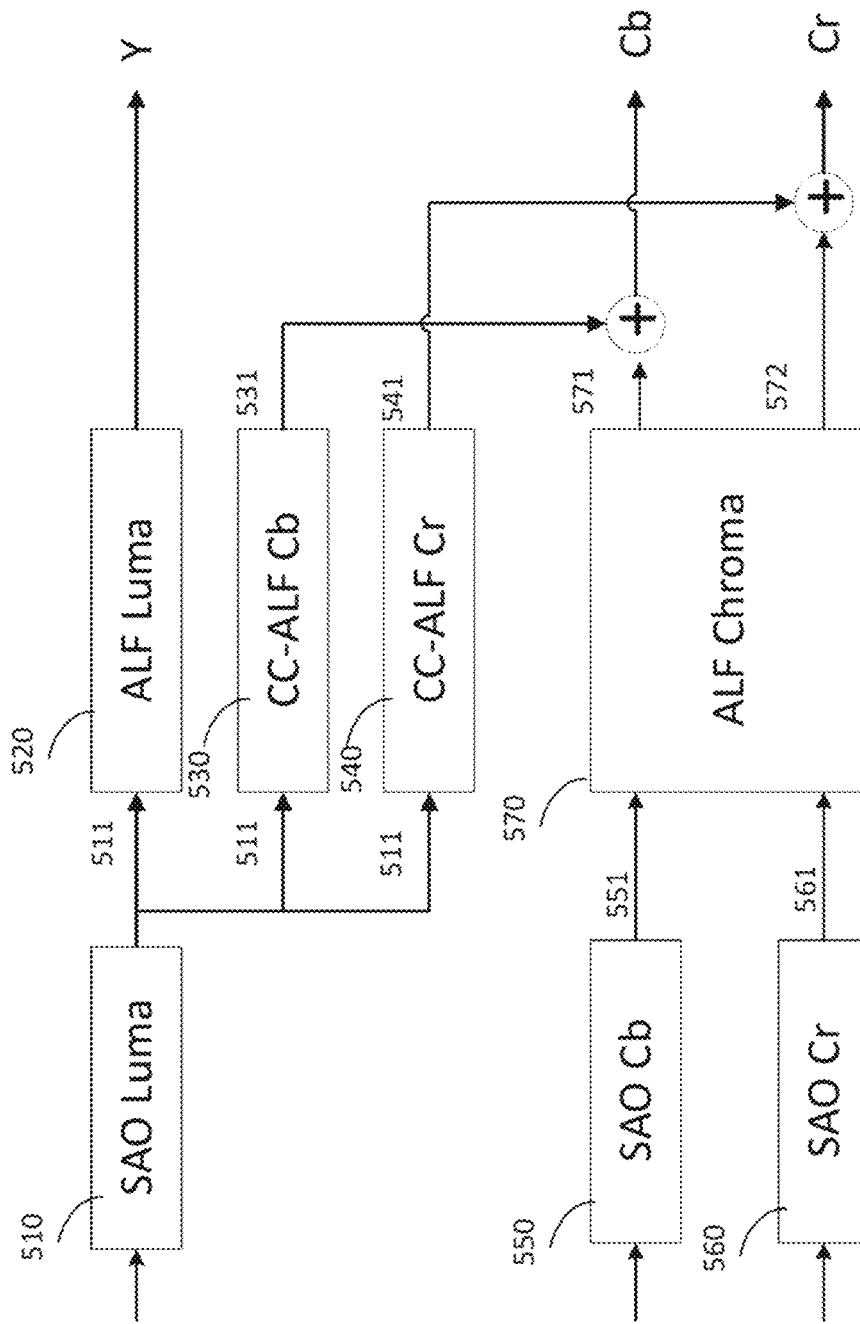
FIG. 5 illustrates a Cross-Component Adaptive Loop Filter (CCALF) process, according to some embodiments of the present disclosure.

In VVC, the Adaptive Loop Filter (ALF) with block-based filter adaption is applied. For the luma component, one filter selected from 25 filters is used for each 4×4 block, based on the direction and activity of local gradients. In addition to ALF, the Cross Component Adaptive Loop Filter (CCALF) is adopted in VVC. The CCALF is designed to operate in parallel with the luma ALF. A linear filter is used in CCALF to filter luma sample values and generate a residual correction for the chroma samples. FIG. 5 illustrates a Cross-Component Adaptive Loop Filter (CCALF) process, according to some embodiments of the present disclosure. As shown in FIG. 5, reconstructed luma sample 511 output from the luma Sample Adaptive Offset (SAO) 510 is taken as an input for luma (Y) ALF 520, chroma (Cb) CC-ALF 530, and chroma (Cr) CC-ALF 540, respectively. Reconstructed chroma samples 551, 561 outputs from the chroma SAO 550, 560, are taken as inputs for chroma ALF 570. Finally, luma sample Y is obtained after the luma ALF 520. Chroma sample Cb is obtained by adding a residual correction 531 output from the Cb CC-ALF 530 and an output 571 of the chroma ALF 570. Chroma sample Cr is obtained by adding a residual correction 541 output from the Cr CC-ALF 540 and an output 572 of the chroma ALF 570.

Figure 6:
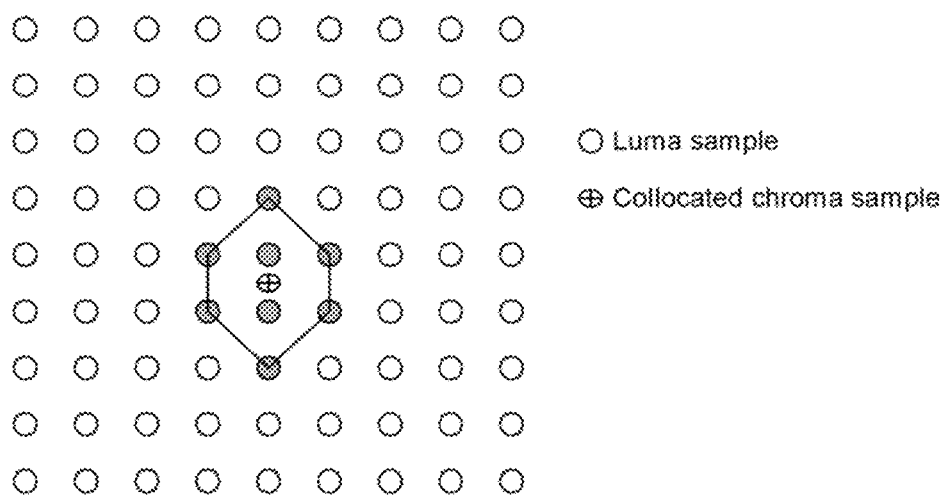
FIG. 6 illustrates an exemplary CCALF filter shape used in Versatile Video Coding (VVC), according to some embodiments of the present disclosure.

FIG. 6 illustrates an exemplary CCALF filter shape in VVC, according to some embodiments of the present disclosure. As shown in FIG. 6, in VVC, an 8-tap hexagon shaped filter 600 is used in the CCALF process.

However, the CCALF of current VVC design cannot achieve optimal compression performance due to following reasons. A single filter shape may not be optimal for all types of content. In VVC, filter coefficients are restricted to only having values in the form of power of 2, from the following set: {−64, −32, −16, −8, −4, −2, −1, 0, 1, 2, 4, 8, 16, 32, 64}. Furthermore, in VVC, same filter coefficients are applied for all type of blocks. However, the correlation between neighboring pixels may depend on the characteristics of the block (such as edge direction, activity etc.).

To improve the compression performance of the CCALF filter, the present disclosure provides methods for shape adaptive cross component filtering.

Figure 7:
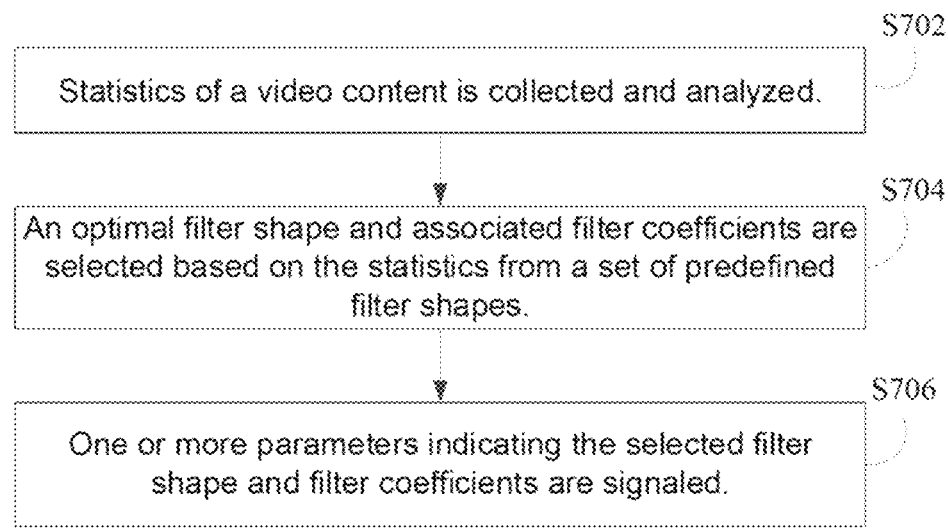
FIG. 7 illustrates a flowchart of an exemplary method for CCALF, according to some embodiments of the present disclosure.

In VVC, a single filter shape (8-tap hexagon shape filters shown in FIG. 6 is used for filtering. However, a correlation between neighboring pixels may depend on characteristics of a video content. A single filter shape is not optimal for all types of content. In the present disclosure, it is proposed to adaptively select the filter shape based on the characteristics of the content. FIG. 7 illustrates a flowchart of an exemplary method 700 for CCALF, according to some embodiments of the present disclosure. Method 700 can be performed by an encoder (e.g., by process 200A of FIG. 2A or 200B of FIG. 2B) or performed by one or more software or hardware components of an apparatus (e.g., apparatus 400 of FIG. 4). For example, a processor (e.g., processor 402 of FIG. 4) can perform method 700. In some embodiments, method 700 can be implemented by a computer program product, embodied in a computer-readable medium, including computer-executable instructions, such as program code, executed by computers (e.g., apparatus 400 of FIG. 4). Referring to FIG. 7, the method 700 can include steps S702 to S706.

At step S702, statistics of a video content is collected and analyzed. For example, direction and activity of gradients of luma samples are collected.

At step S704, an optimal filter shape and associated filter coefficients are selected based on the statistics from a set of predefined filter shapes. For example, for each filter shape in the set of predefined filter shapes, a sum of absolute differences (i.e., SAD) is calculated by the filtered chroma samples and the original samples. A filter shape with a minimum SAD is selected as the optimal filter shape.

In some embodiments, the filtered chroma samples can be obtained by following steps: classifying chroma samples into a plurality of classes using the statistics; calculating filter coefficients associated with each class by minimizing a mean square error of reconstructed chroma samples with respect to the original chroma samples; and applying the associated filter coefficients to the reconstructed chroma samples to obtain filtered chroma samples for each class.

Figure 8:
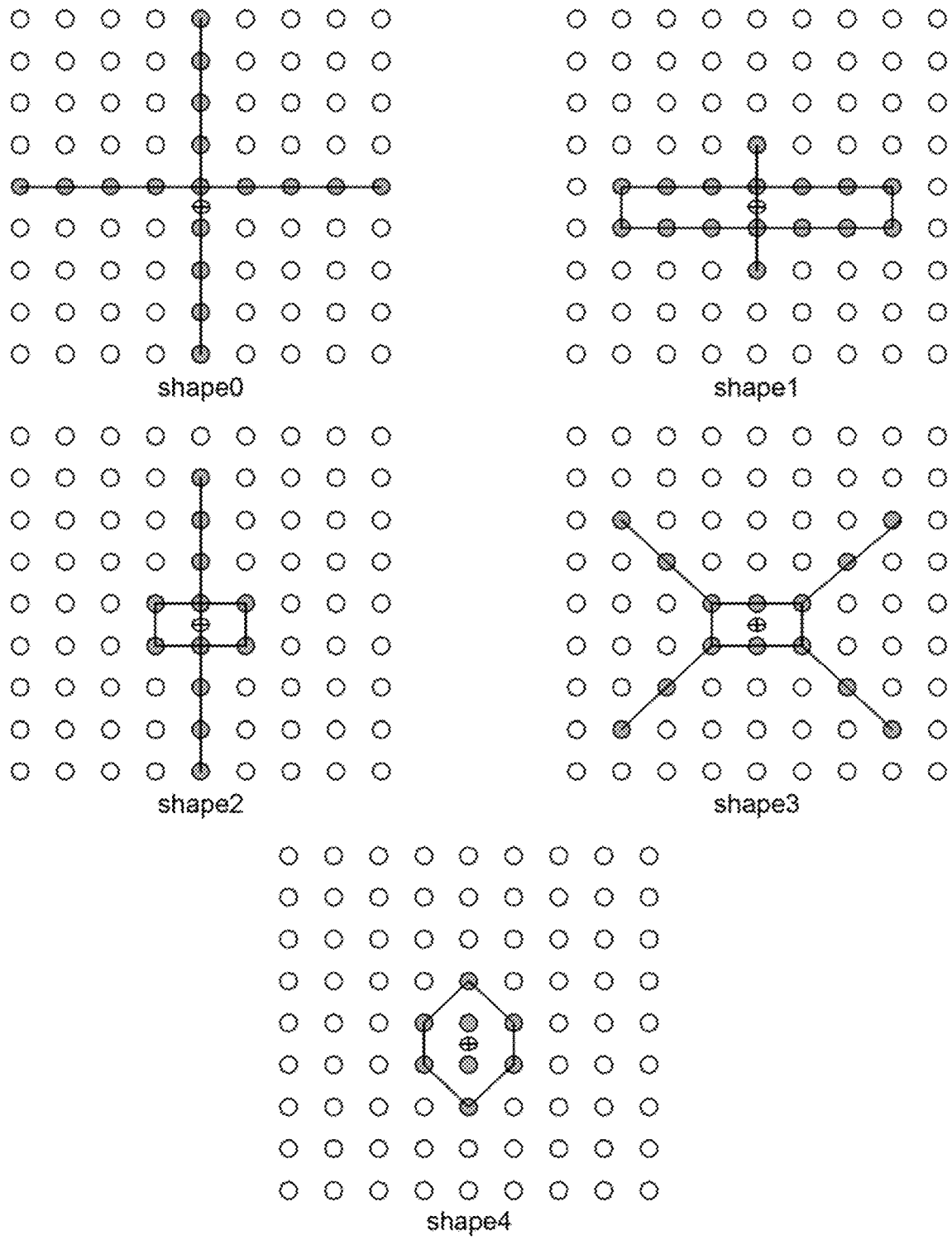
FIG. 8 illustrates five exemplary shapes for CCALF, according to some embodiments of the present disclosure.

In some embodiments, the selection of filter shape is content adaptive, that is the shape of the filter is selected based on the content. The granularity of the selection of shape can be sequence level, and/or frame level, and/or slice level, and/or block level. In some embodiments, multiple shape adaptive cross component filters are provided. FIG. 8 illustrates five exemplary shape adaptive cross component filters for CCALF, according to some embodiments of the present disclosure. The proposed shape adaptive cross component filters can be applied with any shape/pattern and are not limit to the shapes described in FIG. 8. Referring to FIG. 8, the number of taps of the different filter shapes may be same or different. Filter shape4 is the same as the filter 600 shown in FIG. 6. In this example, it is assumed that the filter shapes are pre-defined and known by both encoder and decoder before the encoding/decoding process is performed. In some embodiments, each filter shape can be represented by a shape index (e.g., filters_shape_idx) in syntax. Table 1 shows the number of filter taps associated with each shape corresponding to the shape index.

TABLE 1

Number of taps of each shape defined in FIG. 8 (tap of collocated luma position is not counted because filter is implemented as difference)

| | filters_shape_idx | noCoeff |
|---|---|---|
| Shape0 | 0 | 16 |
| Shape1 | 1 | 15 |
| Shape2 | 2 | 11 |
| Shape3 | 3 | 13 |
| Shape4 | 4 | 7 |

At step S706, one or more parameters indicating the selected filter shape and filter coefficients are signaled, for example, to a decoder. In case of sequence level granularity, the encoder can signal one of the predefined filter shapes to the decoder. Therefore, for a whole sequence, a same filter shape is used for filtering. In case of the frame level granularity, the parameter is signaled for each frame. In case of block level granularity, a frame is divided into multiple non-overlapping blocks, and the parameter is signaled for each block. For the parameter signaled in a frame level or a block level will be further described below.

In some embodiments, the encoder can also signal the total number of predefined filter shapes to the decoder. Alternatively, the total number of filter shapes can be predefined and known for both encoder and decoder before staring encoding/decoding process.

Figure 9:
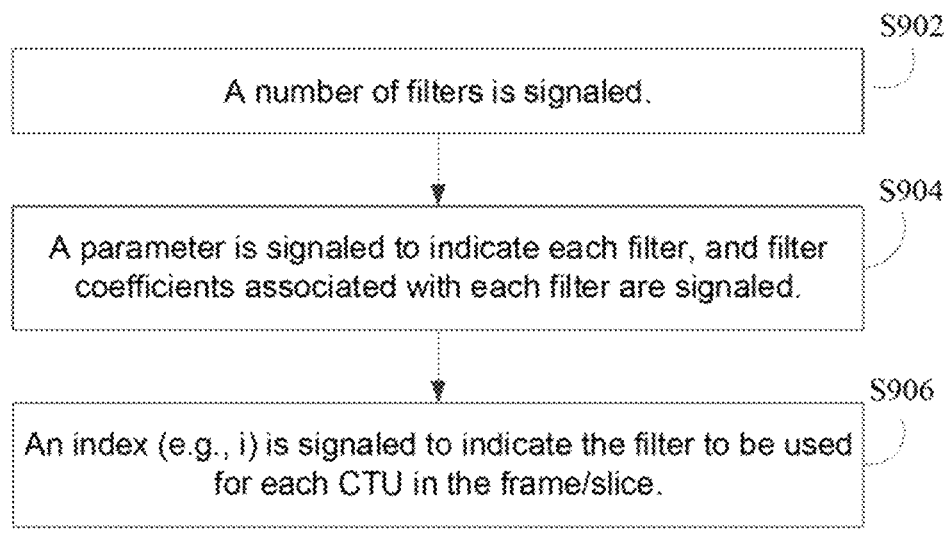
FIG. 9 illustrates a flowchart of an exemplary method for signaling a best CCALF filter shape for each coding tree block (CTB) in a slice for which the CCALF is enabled, according to some embodiments of the present disclosure

For each frame/slice, N filters and the associated shapes and coefficients are signaled to the decoder. For each CTB, a best filter shape is selected (from the N filters signaled in frame/slice) and signaled to the decoder. FIG. 9 illustrates a flowchart of an exemplary method for signaling a best filter shape for each CTB in the slice in CCALF, according to some embodiments of the present disclosure. Method 900 can be performed by an encoder (e.g., by process 200A of FIG. 2A or 200B of FIG. 2B) or performed by one or more software or hardware components of an apparatus (e.g., apparatus 400 of FIG. 4). For example, a processor (e.g., processor 402 of FIG. 4) can perform method 900. In some embodiments, method 900 can be implemented by a computer program product, embodied in a computer-readable medium, including computer-executable instructions, such as program code, executed by computers (e.g., apparatus 400 of FIG. 4). Referring to FIG. 9, the method can include steps S902 to S906.

At step S902, a number of filters is signaled. For example, the number of filters is N. Therefore, N filters are expected by the encoder and decoder. A number of filter shapes is also known by both the encoder and decoder.

At step S904, a parameter (e.g., filter_shape_idx) is signaled to indicate each filter, and filter coefficients associated with each filter are signaled. Therefore, the N filters with the associated filter coefficients are known by the decoder.

At step S906, an index (e.g., i) is signaled to indicate the filter to be used for each CTU in the frame/slice. The maximum value of i is N−1. The filter to be used is selected from the N filters. With the index, the filter shape and the filter coefficient associated with the selected filter can be determined.

In some embodiments, the filter shape is selected implicitly by both encoder/decoders. For instance, in case of block level implicit filter shape derivation, both encoder/decoders can analyze the reconstructed block (before filtering) and based on the characteristics of the reconstructed block, the filter shape is implicitly derived. That is, the filter shape is determined by both the encoder and decoder based on the video content. Therefore, after step S904, the filter to be used can be determined by the decoder.

Details of the proposed shape adaption method are further described. In the following example, it is assumed that there are 5 filter shapes (e.g., the 5 filter shapes shown in FIG. 8) are predefined and known in both encoder and decoder before starting the decoding process. The maximum value of N is 20. The number of coefficients (e.g., noCoeff[k]) of k-th filter shape is also predefined as follows:

noCoeff[ ]=[16, 15, 11, 13, 7]

In VVC, the filter coefficients are signaled in the adaptation parameter sets (APS). In this example, filter coefficients are also signaled in the APS. It should be noted that the filter coefficients are not limited to be signaled through APS only. Alternatively, or additionally, the filter coefficients can be signaled in picture header, and/or slice header etc. For each filter, the shape index is signaled in the bit-stream through APS to indicate the shape of the signaled filter. FIG. 10 shows an exemplary semantics for updated syntax elements, according to some embodiments of the present disclosure. FIG. 11 shows an exemplary ALF APS syntax, according to some embodiments of the present disclosure. As shown in FIG. 10, values of the syntax elements alf_cc_cbfilters_shape_idx[k] 1010 and alf_cc_cr_filters_shape_idx[k] 1020 are modified. And referring to FIG. 11, the syntax elements alf_cc_cb_filters_shape_idx[k] and alf_cc_cr_filters_shape_idx[k] are signaled to indicate the shape of the k-th filter 1110, 1120. Filter coefficients associated with each filter is further signaled 1130, 1140.

FIG. 12 shows an exemplary updated VVC specification for the CCALF process, according to some embodiments of the present disclosure. Consistent with FIGS. 9 to 11, as shown in FIG. 12, the parts in italic show the modification as compared to existing VVC method. Before starting the CCALF process of each CTB, the variable CcAlfShape is derived, which represents the filter shape of the current CTB 1210. The filter coefficient and neighboring tap's locations are adaptively selected based on the value of the variable CcAlfShape 1220.

The present disclosure also provides methods for removing power of 2 constraint of the filter coefficient values.

In VVC, CCALF filter coefficients are restricted to the values in the form of power of 2, from the following set: {−64, −32, −16, −8, −4, −2, −1, 0, 1, 2, 4, 8, 16, 32, 64}. In the present disclosure, it is proposed to remove this constraint to improve the compression performance. In some embodiments, the value of the filter coefficient can be any integer value between −64 to +64, inclusive. In some embodiments, the filter coefficients are coded using variable length code (i.e., ue(v) coding), whereas in VVC the mapped coefficients are coded using fixed length code. FIG. 13 shows the changes of semantics as compared to VVC, according to some embodiments of the present disclosure. FIG. 14 shows an exemplary APS syntax table, according to some embodiments of the present disclosure. Referring to FIG. 13, the constrains for the values of filter coefficients are removed 1310. Referring to FIG. 14, the filter coefficients are coded using variable length code (i.e., ue(v) coding) 1410.

The present disclosure also provides methods for block level filter coefficients adaption.

Figure 15:
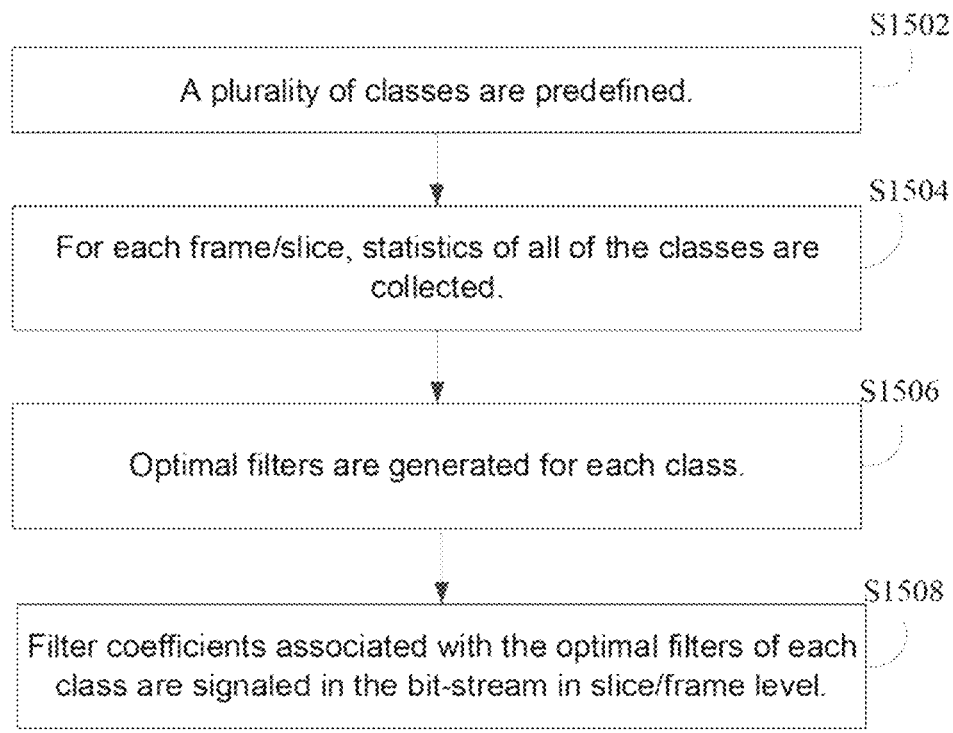
FIG. 15 illustrates a flowchart of an exemplary method for signaling parameters associated with CCALF, according to some embodiments of the present disclosure.

In VVC, the filter coefficients are signaled in the slice level through APS. A same set of filter coefficients may not be optimal for all part of the frame/slice. In some embodiments, the slice is divided into multiple non-overlapping M×N blocks. Then, each M×N block is classified into one of the predefined classes based on the characteristics of the reconstructed block (before filtering). The block is classified using reconstructed samples before filtering, and the reconstructed samples (before filtering) are already known to the decoder before starting the CCALF process. Therefore, signaling is not required to indicate the class of the block. FIG. 15 illustrates a flowchart of a method 1500 for signaling parameters associated with CCALF, according to some embodiments of the present disclosure. Method 1500 can be performed by an encoder (e.g., by process 200A of FIG. 2A or 200B of FIG. 2B) or performed by one or more software or hardware components of an apparatus (e.g., apparatus 400 of FIG. 4). For example, a processor (e.g., processor 402 of FIG. 4) can perform method 1500. In some embodiments, method 1500 can be implemented by a computer program product, embodied in a computer-readable medium, including computer-executable instructions, such as program code, executed by computers (e.g., apparatus 400 of FIG. 4). The method can include steps S1502 to S1506.

At step S1502, a plurality of classes are predefined. Classification methods are further described below.

At step S1504, for each frame/slice, statistics of all of the classes are collected.

At step S1506, optimal filters are generated for each class. For example, the optimal filters can be generated based on characteristics of the class.

At step S1508, filter coefficients associated with the optimal filters of each class are signaled in the bit-stream at slice/frame level.

Furthermore, methods for block classification are also provided.

Figure 16:
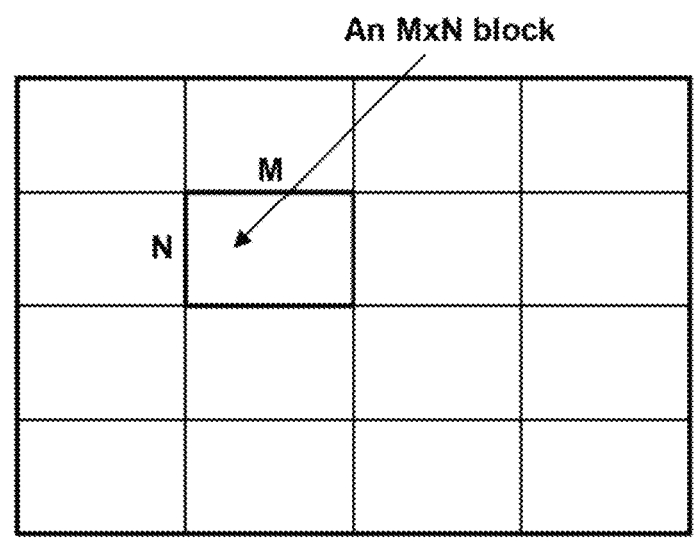
FIG. 16 shows an illustration of an exemplary method for block classification, according to some embodiments of the present disclosure.

FIG. 16 shows an illustration of a method for block classification, according to some embodiments of the present disclosure. Referring to FIG. 16, an image is divided into 16 blocks. In this example, before starting the CCALF process, each M×N block of luma component can be classified as one of the predefined classes. The maximum number of classes is predefined and known to both encoder and decoder before starting the process.

An example of block classification is described below, where it is assumed that a maximum number of classes is 15 and the classification block size is 4×4 as shown in FIG. 16.

In this example, the classification method is similar to the classification of adaptive loop filters of VVC. However, the classification methods in the present disclosure are not limited.

In this example, for luma component, each 4×4 block is categorized into one of 15 classes. The classification index C is derived based on its directionality D and a quantized value of activity $\hat{A}$, as follows:

$$C = 5D + \hat{A}$$

To calculate D and $\hat{A}$, gradients of the horizontal, vertical and two diagonal directions are first calculated using 1-D Laplacian:

$$g_v = \sum_{k=i-2}^{i+3} \sum_{l=j-2}^{j+3} V_{k,l}, \ V_{k,l} = |2R(k,l) - R(k, l-1) - R(k, l+1)|$$

$$g_h = \sum_{k=i-2}^{i+3} \sum_{l=j-2}^{j+3} H_{k,l}, \ H_{k,l} = |2R(k,l) - R(k-1, l) - R(k+1, l)|$$

$$g_{d1} = \sum_{k=i-2}^{i+3} \sum_{l=j-3}^{j+3} D1_{k,l}, \ D1_{k,l} = |2R(k,l) - R(k-1, l-1) - R(k+1, l+1)|$$

$$g_{d2} = \sum_{k=i-2}^{i+3} \sum_{j=j-2}^{j+3} D2_{k,l}, \ D2_{k,l} = |2R(k,l) - R(k-1, l+1) - R(k+1, l-1)|$$

where indices i and j refer to the coordinates of the upper left sample within the 4×4 block and R(i, j) indicates a reconstructed sample at coordinate (i, j).

Figure 17:
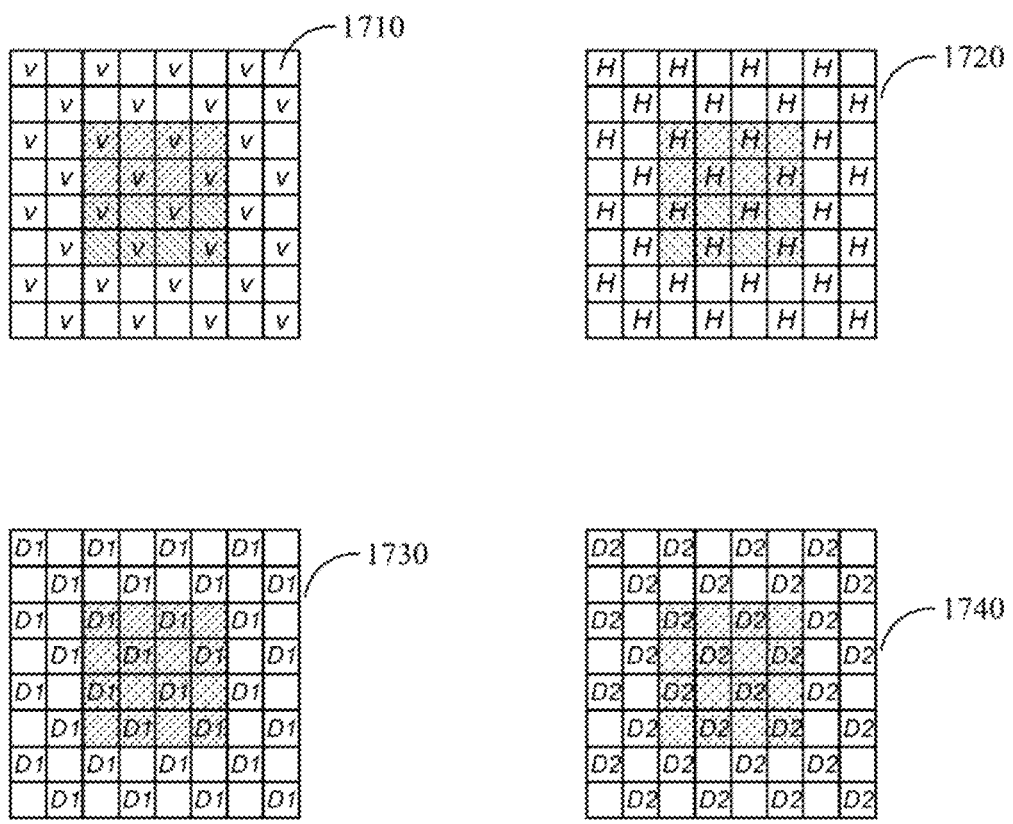
FIG. 17 illustrates four computations of the gradients for block classification, according to some embodiments of the present disclosure.

To reduce the complexity of block classification, a subsampled 1-D Laplacian calculation is applied. FIG. 17 illustrates four computations of the gradients for block classification, according to some embodiments of the present disclosure. As shown in FIG. 17, the same subsampled positions are used for gradient calculation of all directions, for example, for vertical gradient 1710, horizontal gradient 1720, and two diagonal gradients 1730, 1740.

Then D maximum and minimum values of the gradients of horizontal and vertical directions are set as:

$$g_{h,v}^{max} = \max(g_h, g_v), \ g_{h,v}^{min} = \min(g_h, g_v)$$

The maximum and minimum values of the gradient of two diagonal directions are set as:

$$g_{d0,d1}^{max} = \max(g_{d0}, g_{d1}), \ g_{d0,d1}^{min} = \min(g_{d0}, g_{d1})$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \sum_{k=i-2}^{i+3} \sum_{l=j-2}^{j+3} (V_{k,l} + H_{k,l})$$

A is further quantized to the range of 0 to 2, inclusively, and the quantized value is denoted as $\hat{A}$.

The classification method described above is merely an exemplary method, and the specific block size and the classification method are not limited in the present disclosure. For instance, any block classification method known in the art can also be used. Alternatively, the classification method of luma ALF method can also be directly reused without doing classification for CCALF itself.

The present disclosure also provides methods for filter coefficients signaling.

In some embodiments, for each frame/slice the filter coefficients for each class are signaled in the bit-stream. For instance, in the above example, for each slice, the encoder can generate totally 15 filters (each for each class) and signal their parameters to the decoder. FIG. 18 shows an example of the APS syntax to signal the filter coefficients of all classes, according to some embodiments of the present disclosure. As shown in FIG. 18, 15 filters for 15 classes are signaled with associated filter coefficients for CC-Cb filter 1810 and CC-Cr filter 1820, respectively. It can be understood that the number of classes is not limited to 15. FIG. 19 shows the semantic changes as compared to VVC, according to some embodiments of the present disclosure. In some embodiments, each luma pixel is classified as one of the predefined classes. FIG. 20 shows the detail of the specification changes as compared to VVC, according to some embodiments of the present disclosure.

Figure 21:
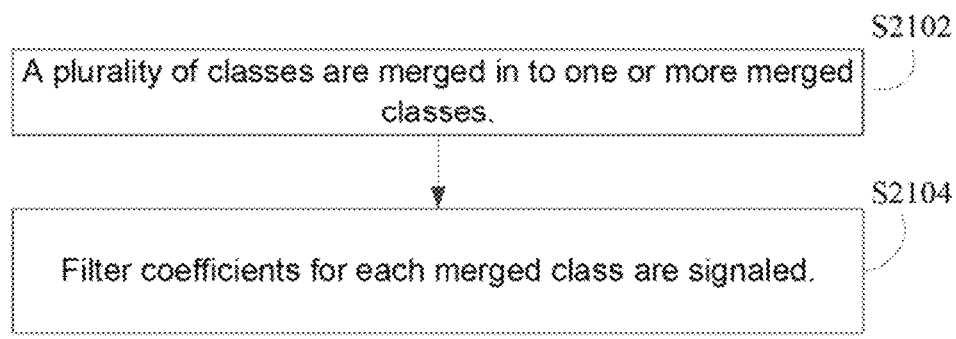
FIG. 21 illustrates a flowchart of a method for signaling filter coefficients using class merging, according to some embodiments of the present disclosure.

As shown in FIG. 18, filter coefficients for each filter corresponding to each class are signaled, which may introduce significant overhead signaling bits. In order to reduce the overhead signaling bits, an alternative approach of signaling filter coefficients is proposed. In some embodiments, the encoder uses a class merging method where number of a class(es) is adaptively selected based on the content. FIG. 21 illustrates a flowchart of a method 2100 for signaling filter coefficients using class merging, according to some embodiments of the present disclosure. Method 2100 can be performed by an encoder (e.g., by process 200A of FIG. 2A or 200B of FIG. 2B) or performed by one or more software or hardware components of an apparatus (e.g., apparatus 400 of FIG. 4). For example, a processor (e.g., processor 402 of FIG. 4) can perform method 2100. In some embodiments, method 2100 can be implemented by a computer program product, embodied in a computer-readable medium, including computer-executable instructions, such as program code, executed by computers (e.g., apparatus 400 of FIG. 4). As shown in FIG. 21, the method 2100 can include steps S2102 and S2104.

At step S2102, a plurality of filters are merged in to one or more merged classes. Each merged class includes one or more filters. Each merged class has its own index. For example, the number of the plurality of classes is N (i.e., the number of filters is N), and a merged class can include M classes (i.e., filters), wherein N is an integer equal to or lager than M. For example, with the above discussed example, 15 filters are generated for 15 classes. A maximum number of the merged class can be 15, with an index from 0 to 14. In some embodiments, the 15 filters can be merged into 6 merged class for example. Each merged class may include one or more filters, which may be merged based on a similarity of filter coefficients of filters. A filter for the merged class is used for processing.

At step S2104, filter coefficients for each merged class are signaled. In some embodiments, the filter 600 shown in FIG. 6 is used, of which the number of filter coefficient is 7.

With this method, since the number of merged classes is equal to or less than the number of classes, the overhead signaling bit can be reduced, both for filters and filter coefficients.

For example, in syntax, a filter set can be represented by syntax element filter set, which can be defined as follows:

```
filter_set{
    int number_of_merged_class;
    int filter_coeff[ ][ ];
    int merge_index_array[ ];
    };
```
where,
- number_of_merged_class is the number of classes signaled in the frame/slice after class merging. The minimum value of number_of_merged_class is 1 and the maximum value is the maximum number of class (i.e., 15 in the above example), inclusive.
- filter_coeff[c][j] is the j-th filter coefficient of c-th merged class. The maximum value of c is number_of_merged_class − 1.
- merge_index_array is one dimensional array of size 15 (assume 15 is the maximum number of classes).

The j-th filter coefficient of a class c (c= 0 to 14) is equal to filter_coeff [merge_index_array [c]][j].

FIG. 22 shows APS syntax of the method for signaling filter coefficients using class merging, according to some embodiments of the present disclosure. Referring to FIG. 22, the merged class and corresponding filters are signed 2210, 2220. FIG. 23 shows the semantic changes as compared to VVC, according to some embodiments of the present disclosure.

Figure 24:
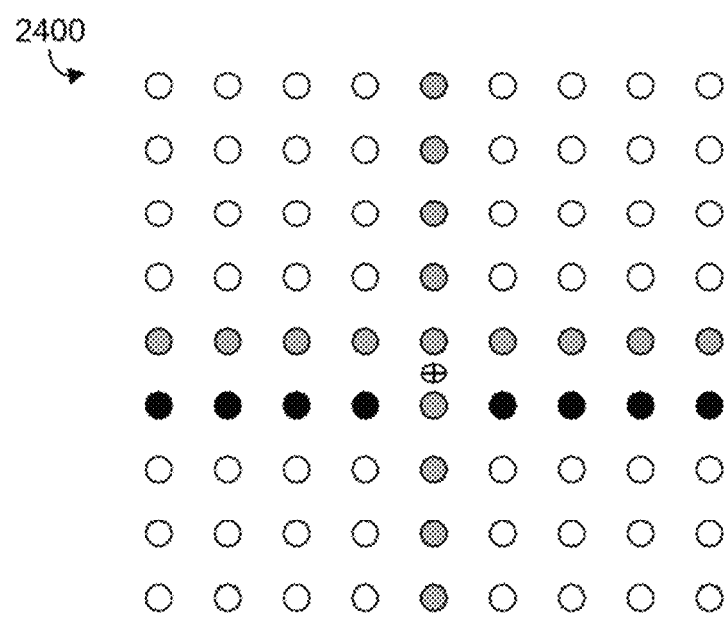
FIG. 24 illustrates an exemplary 24-tap 9×9 filter, according to some embodiments of the present disclosure.

In some embodiments, a single shape CCALF filter is used for all CTUs of a slice. FIG. 24 illustrates an exemplary 24-tap 9×9 filter 2400, according to some embodiments of the present disclosure. As shown in the FIG. 24, filter 2400 has a generally cross shape. Specifically, the 24-tap 9×9 filter 2400 is defined as below:

$$\begin{bmatrix} & & & & C_0 & & & & \\ & & & & C_1 & & & & \\ & & & & C_2 & & & & \\ & & & & C_3 & & & & \\ C_9 & C_{10} & C_{11} & C_{12} & C_4 & C_{13} & C_{14} & C_{15} & C_{16} \\ C_{17} & C_{18} & C_{19} & C_{20} & C_5 & C_{21} & C_{22} & C_{23} & C_{24} \\ & & & & C_6 & & & & \\ & & & & C_7 & & & & \\ & & & & C_8 & & & & \end{bmatrix}$$

wherein $C_0$ to $C_{24}$ are filter coefficients associated with the 24-tap 9×9 filter 2400.

FIG. 25 shows the modification of the CCALF process using the filter 2400 compared to the VVC specification, according to some embodiments of the present disclosure. The parts in italic show the modification as compared to existing VVC method. Referring to FIG. 25, the number of filter coefficients 2510 is modified to 24, and a variable sum 2520 is modified accordingly.

Figure 26:
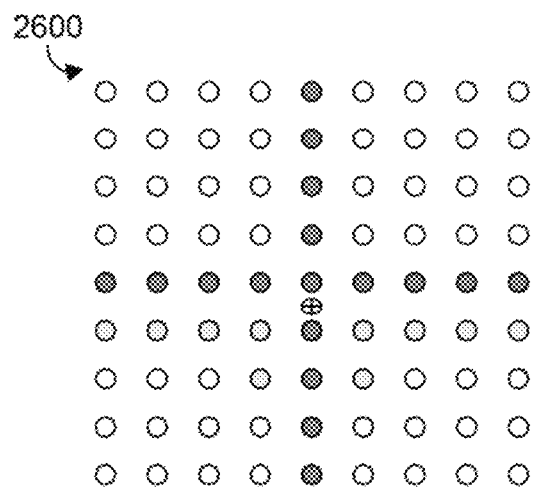
FIG. 26 shows an exemplary 28-tap filter, according to some embodiments of the present disclosure.
Figure 27:
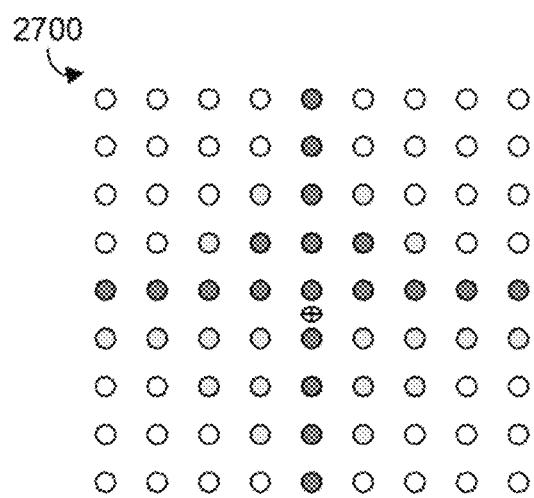
FIG. 27 shows an exemplary 36-tap filter, according to some embodiments of the present disclosure.

In some embodiments, more filters are provided. FIG. 26 and FIG. 27 show an exemplary 28-tap filter 2600 and an exemplary 36-tap filter 2700, respectively, according to some embodiments of the present disclosure. It can be understood that, if the 28-tap filter 2600 or the 36-tap filter 2700 is used, the number of filter coefficients and the variable sum need to be modified accordingly.

The present disclosure also provides methods for filter coefficients signaling. In VVC, CCALF filter coefficients are restricted to having only values in the form of power of 2, from the following set: {−64, −32, −16, −8, −4, −2, −1, 0, 1, 2, 4, 8, 16, 32, 64}. In VVC specification, a fixed length code is used to signal the index of the filter coefficients.

In some embodiments, the values of the filter coefficients are restricted to power of 2. However, instead of using fixed length code, the variable length code (more specifically unary coding) is used to signal the filter coefficients. FIG. 28 shows the APS syntax table of the proposed method, according to some embodiments of the present disclosure. Referring to FIG. 28, the filter coefficients signaled are coded in variable length (e.g., ue(v)) 2810. Therefore, the filter coefficients can be more flexible, removing a constrain of values in the form of power of 2.

Figure 29:
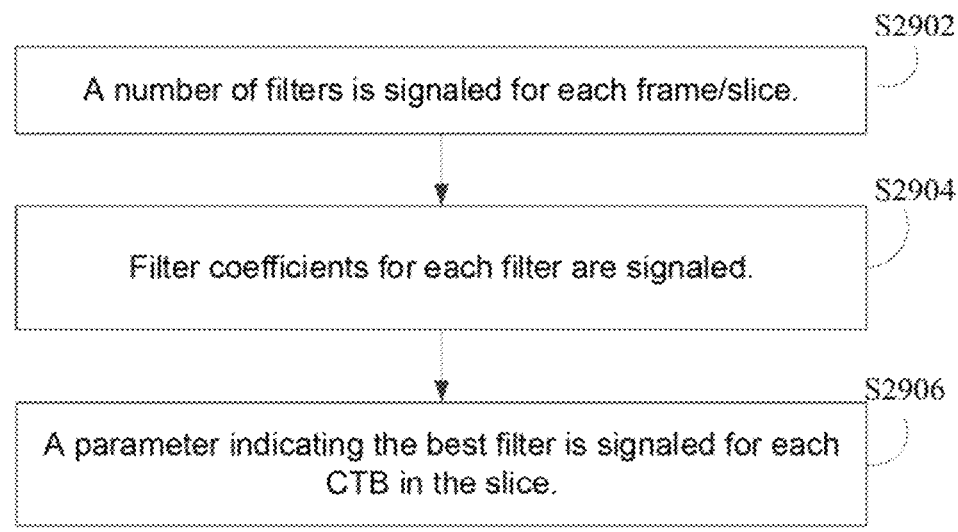
FIG. 29 illustrates a flowchart of an exemplary method for signaling a best filter for each CTB, according to some embodiments of the present disclosure.

In the present disclosure, methods for CTB level mapped filter index signaling are further provided. In VVC, for each frame/slice, a number of N filters and coefficients are signaled. For each CTB, the encoder can select the best filter to be signaled to the decoder. FIG. 29 illustrates a flowchart of an exemplary method for signaling a best filter for each CTB, according to some embodiments of the present disclosure. Method 2900 can be performed by an encoder (e.g., by process 200A of FIG. 2A or 200B of FIG. 2B) or performed by one or more software or hardware components of an apparatus (e.g., apparatus 400 of FIG. 4). For example, a processor (e.g., processor 402 of FIG. 4) can perform method 2900. In some embodiments, method 2900 can be implemented by a computer program product, embodied in a computer-readable medium, including computer-executable instructions, such as program code, executed by computers (e.g., apparatus 400 of FIG. 4). As shown in FIG. 29, the method 2900 can include steps S2902 to S2906.

At step S2902, a number of filters is signaled for each frame/slice. For example, the number of filters is N. Therefore, N is known by both the encoder and decoder. A number of filter shapes is also known by both the encoder and decoder.

At step S2904, filter coefficients for each filter are signaled.

At step S2906, a parameter indicating the best filter is signaled for each CTB in the slice. For example, the parameter can be a filter index (e.g., filter_idc), the maximum value of the index is N−1. In some embodiments, the maximum value of the index is N, and when the filter index (e.g., filter_idc) is equal to 0, there is no filtering applied.

Figure 30:
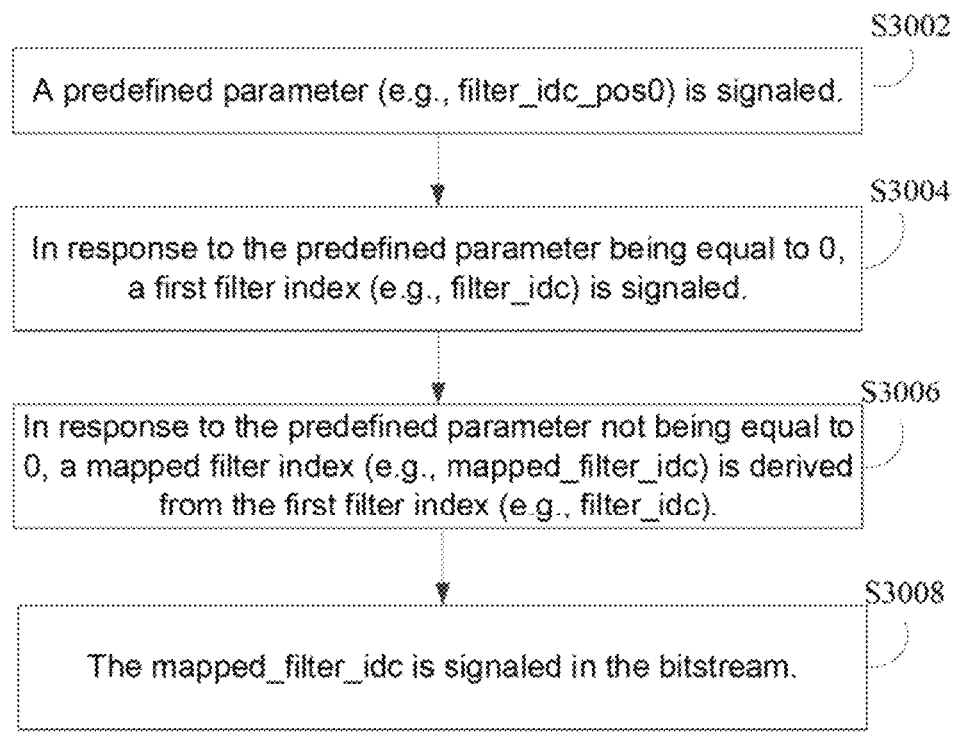
FIG. 30 illustrates a flowchart of an exemplary method for video processing, according to some embodiments of the present disclosure.

In the method provided by the present disclosure, for each CTB, instead of signaling the filter index (e.g., filter_idc) directly, a mapped filter index is signaled to the decoder. FIG. 30 illustrates a flowchart of an exemplary method 3000 for video processing, according to some embodiments of the present disclosure. Method 3000 can be performed by an encoder (e.g., by process 200A of FIG. 2A or 200B of FIG. 2B) or performed by one or more software or hardware components of an apparatus (e.g., apparatus 400 of FIG. 4). For example, a processor (e.g., processor 402 of FIG. 4) can perform method 3000. In some embodiments, method 3000 can be implemented by a computer program product, embodied in a computer-readable medium, including computer-executable instructions, such as program code, executed by computers (e.g., apparatus 400 of FIG. 4). As shown in FIG. 30, the method 3000 can include steps S3002 to S3008.

At step S3002, a predefined parameter (e.g., filter_idc_pos0) is signaled. The value of the predefined parameter (e.g., filter_idc_pos0) can be any value between 0 to N, and N is the number of filters to be signaled.

At step S3004, in response to the predefined parameter being equal to 0, a first filter index (e.g., filter_idc) is signaled. That is, the method 2900 is performed.

At step S3006, in response to the predefined parameter not being equal to 0, a mapped filter index (e.g., mapped_filter_idc) is derived from the first filter index (e.g., filter_idc). In some embodiments, the predefined parameter is assumed to be equal to 1, and known by both encoder and decoder. The mapped filter index can be derived by the following steps: in response to the first filter index being equal to 0, a value of the mapped filter index is set as a value the predetermined parameter (e.g., 1); in response to the first filter index being less than or equal to the predetermined parameter, the value of the mapped filter index is set as a value of the first filter index minus 1; and for other cases, the value of the mapped filter index is set as a value of the first filter index. For example, a pseudo code can be described as below:

```
filter_idc_pos0 = 1;
if (filter_idc == 0)
    mapped_filter_idc = filter_idc_pos0;
else if (filter_idc <= filter_idc_pos0)
    mapped_filter_idc = filter_idc − 1;
else
    mapped_filter_idc = filter_idc;
```

At step S3008, the mapped_filter_idc is signaled in the bitstream.

Since the filter_idc is not equal binarized, the number of bits is reduced, when filter_idc is not equal to 0.

In the decoder side, the first filter index is derived from the mapped filter index. In some embodiments, the predefined parameter is assumed to be equal to 1, and known by both the encoder and decoder. The first filter index can be derived by the following steps: in response to a value of the mapped filter index being equal to a value of the predetermined parameter, the first filter index is set as 0, that is, there is no filtering applied; in response to a value of the mapped filter index being less than the value of the predetermined parameter, the value of the first filter index is set as a value of the mapped filter index plus 1; and for other values, the value of the first filter index is set as a value of the mapped filter index. For example, a pseudo code can be described as below:

```
filter_idc_pos0 = 1;
if (mapped_filter_idc == filter_idc_pos0)
    filter_idc = 0;
else if (mapped_filter_idc < filter_idc_pos0)
    filter_idc = mapped_filter_idc + 1;
else
    filter_idc = mapped_filter_idc;
```

In the above pseudo code, it is assumed that filter_idc_pos0 is fixed (equal to 1) to the coded video sequence. In some embodiments, the value of filter_idc_pos0 can also be adaptively derived in each CTB. One way to derive the value of filter_idc_pos0 is based on the previously decoded neighboring CTBs. For instance, if the filter_idc of the top or left CTB is non-zero value, filter_idc_pos0 of the current CTB can be set to 1; otherwise, filter_idc_pos0 is equal to 0. For example, a pseudo code can be described as below:

```
Assume,
filter_idc_top = filter_idc of the above CTB
filter_idc_left = filter_idc of the left CTB
if (filter_idc_top || filter_idc_left)
```

```
filter_idc_pos0 = 1;
else
    filter_idc_pos0 = 0;
```

The present disclosure also provides methods for improving context coding of the filter index. In VVC, two syntax elements alf_ctb_cc_cb_idc and alf_ctb_cc_cr_idc are signaled in the bitstream to indicate the index of the filter used for a target CTB. For both alf_ctb_cc_cb_idc and alf_ctb_cc_cr_idc, only first bin is context coded and the rest of the bins are bypass coded.

In some embodiments, both the first and second bins are context coded, and the rest of the bins are bypass coded.

To a person skilled in the art of video coding, the above embodiments might be combined into one embodiment.

The embodiments may further be described using the following clauses:

1. A method for video processing using Cross-Component Adaptive Loop Filter (CCALF), comprising:
   filtering decoded video content using a CCALF, wherein the CCALF is a 24-tap 9×9 filter.

2. The method according to clause 1, wherein the 24-tap 9×9 filter has a cross shape defined as:

$$\begin{bmatrix} & & & & C_0 & & & & \\ & & & & C_1 & & & & \\ & & & & C_2 & & & & \\ & & & & C_3 & & & & \\ C_9 & C_{10} & C_{11} & C_{12} & C_4 & C_{13} & C_{14} & C_{15} & C_{16} \\ C_{17} & C_{18} & C_{19} & C_{20} & C_5 & C_{21} & C_{22} & C_{23} & C_{24} \\ & & & & C_6 & & & & \\ & & & & C_7 & & & & \\ & & & & C_8 & & & & \end{bmatrix}$$

wherein $C_0$ to $C_{24}$ are filter coefficients of the 24-tap 9×9 filter.

3. The method according to clause 1 or 2, wherein the decoded video content comprises a video slice, and the 24-tap 9×9 filter is applied to all coding tree units (CTUs) of the video slice.

4. The method according to any one of clauses 1 to 3, wherein values of the filter coefficients are integer values between −64 and +64.

5. The method according to any one of clauses 1 to 4, wherein the filter coefficients are coded using variable length code.

6. A method for video processing using Cross-Component Adaptive Loop Filter (CCALF), comprising:
   receiving a bitstream;
   determining a CCALF based on a first index signaled in the bitstream;
   determining a first filter shape based on a second index signaled in the bitstream, the first filter shape being selected from a set of pre-defined filter shapes for the CCALF;
   determining, based on the first index, filter coefficients of the CCALF; and
   filtering decoded video content using the first filter shape and the filter coefficients.

7. The method according to clause 6, wherein values of the filter coefficients are integer values between −64 and +64.

8. The method according to clause 6 or 7, wherein the filter coefficients are coded using variable length code.

9. The method according to any one of clauses 6 to 8, wherein the first index is indicated by a syntax element signaled in the bitstream, the syntax element is associated with a coding tree block (CTB), and the method further comprises:
   context decoding a first bin and a second bin of the syntax element.

10. A method for video processing using Cross-Component Adaptive Loop Filter (CCALF), comprising:
    receiving a bitstream;
    determining a CCALF based on a first index signaled in the bitstream;
    determining a first filter shape based on characteristics of a reconstructed block, the first filter shape being selected from a set of pre-defined filter shapes for the CCALF;
    determining, based on the first index, filter coefficients of the CCALF; and
    filtering decoded video content using the first filter shape and the filter coefficients.

11. A method for video processing using Cross-Component Adaptive Loop Filter (CCALF), comprising:
    receiving a bitstream;
    determining N CCALFs based on the bitstream;
    determining a first filter based on the bitstream, the first filter being one of the N CCALFs; and
    filtering decoded video content using the first filter.

12. The method according to clause 11, wherein determining the first filter based on the bitstream, further comprises:
    determining a first filter index based on a mapped filter index, wherein: in response to a value of the mapped filter index being less than a predetermined value, a value of the first filter index is set as the value of the mapped filter index plus 1, or in response to the value of the mapped filter index being greater than the predetermined value, the value of the first filter index is set as the value of the mapped filter index; and
    determining the first filter based on the first filter index, wherein the predetermined parameter is in a range of 1 to N.

13. The method according to clause 12, where the predetermined value is set as 1.

14. The method according to clause 12, wherein the predetermined value is associated with a target coding tree (CTB) and is determined based on previously decoded neighboring CTBs.

15. The method according to clause 14, wherein the first filter index is associated with a previously decoded top CTB or a previously decoded left CTB, and the method further comprises:
    in response to the value of the first filter index being non-zero, setting the predetermined value as 1.

16. A method for video processing using Cross-Component Adaptive Loop Filter (CCALF), comprising:
    receiving a bitstream associated with a video slice;
    generating, based on the bitstream, a plurality of reconstructed blocks associated with the video slice;
    classifying the plurality of reconstructed blocks into one or more classes based on characteristics of the plurality of reconstructed blocks;
    determining, based on the bitstream, a set of CCALF coefficients for each of the one or more classes; and
    filtering the one or more classes of reconstructed blocks using the respective sets of CCALF coefficients.

17. The method according to clause 16, wherein the plurality of blocks are luma blocks.

18. The method according to clause 17, wherein each luma pixel of the video sequence is classified into one of the plurality of classes.

19. The method according to clause 16, wherein the one or more classes include M classes, M being a positive integer, and wherein classifying the plurality of reconstructed blocks into one or more classes based on characteristics of the plurality of reconstructed blocks, further comprises:
  classifying the plurality of reconstructed blocks into N classes based on characteristics of the plurality of reconstructed blocks, N being an integer larger than M; and
  merging the N classes into the one or more classes.

20. The method according to clause 19, wherein the plurality of classes are merged based on a similarity of the filter coefficients of the CCALFs associated with the plurality of classes.

21. An apparatus for performing video processing using Cross-Component Adaptive Loop Filter (CCALF), the apparatus comprising:
  a memory figured to store instructions; and
  one or more processors configured to execute the instructions to cause the apparatus to perform:
    filtering decoded video content using a CCALF, wherein the CCALF is a 24-tap 9×9 filter.

22. The apparatus according to claim 21, wherein the 24-tap 9×9 filter has a cross shape defined as:

$$\begin{bmatrix} & & & & C_0 & & & & \\ & & & & C_1 & & & & \\ & & & & C_2 & & & & \\ & & & & C_3 & & & & \\ C_9 & C_{10} & C_{11} & C_{12} & C_4 & C_{13} & C_{14} & C_{15} & C_{16} \\ C_{17} & C_{18} & C_{19} & C_{20} & C_5 & C_{21} & C_{22} & C_{23} & C_{24} \\ & & & & C_6 & & & & \\ & & & & C_7 & & & & \\ & & & & C_8 & & & & \end{bmatrix}$$

wherein $C_0$ to $C_{24}$ are filter coefficients of the 24-tap 9×9 filter.

23. The apparatus according to clause 21 or 22, wherein the decoded video content comprises a video slice, and the 24-tap 9×9 filter is applied to all coding tree units (CTUs) of the video slice.

24. The apparatus according to any one of clauses 21 to 23, wherein values of the filter coefficients are integer values between −64 and +64.

25. The apparatus according to any one of clauses 21 to 24, wherein the filter coefficients are coded using variable length code.

26. An apparatus for performing video processing using Cross-Component Adaptive Loop Filter (CCALF), the apparatus comprising:
  a memory figured to store instructions; and
  one or more processors configured to execute the instructions to cause the apparatus to perform:
  receiving a bitstream;
  determining a CCALF based on a first index signaled in the bitstream;
  determining a first filter shape based on a second index signaled in the bitstream, the first filter shape being selected from a set of pre-defined filter shapes for the CCALF;
  determining, based on the first index, filter coefficients of the CCALF; and
  filtering decoded video content using the first filter shape and the filter coefficients.

27. The apparatus according to clause 26, wherein values of the filter coefficients are integer values between −64 and +64.

28. The apparatus according to clause 26 or 27, wherein the filter coefficients are coded using variable length code.

29. The apparatus according to any one of clauses 26 to 28, wherein the first index is indicated by a syntax element signaled in the bitstream, the syntax element is associated with a coding tree block (CTB), and the one or more processors are further configured to execute the instructions to cause the apparatus to perform:
  context decoding a first bin and a second bin of the syntax element.

30. An apparatus for performing video processing using Cross-Component Adaptive Loop Filter (CCALF), the apparatus comprising:
  a memory figured to store instructions; and
  one or more processors configured to execute the instructions to cause the apparatus to perform:
  receiving a bitstream;
  determining a CCALF based on a first index signaled in the bitstream;
  determining a first filter shape based on characteristics of a reconstructed block, the first filter shape being selected from a set of pre-defined filter shapes for the CCALF;
  determining, based on the first index, filter coefficients of the CCALF; and
  filtering decoded video content using the first filter shape and the filter coefficients.

31. An apparatus for performing video processing using Cross-Component Adaptive Loop Filter (CCALF), the apparatus comprising:
  a memory figured to store instructions; and
  one or more processors configured to execute the instructions to cause the apparatus to perform:
  receiving a bitstream;
  determining N CCALFs based on the bitstream;
  determining a first filter based on the bitstream, the first filter being one of the N CCALFs; and
  filtering decoded video content using the first filter.

32. The apparatus according to clause 31, wherein in determining the first filter based on the bitstream, the one or more processors are further configured to execute the instructions to cause the apparatus to perform:
  determining a first filter index based on a mapped filter index, wherein: in response to a value of the mapped filter index being less than a predetermined value, a value of the first filter index is set as the value of the mapped filter index plus 1, or in response to the value of the mapped filter index being greater than the predetermined value, the value of the first filter index is set as the value of the mapped filter index; and
  determining the first filter based on the first filter index, wherein the predetermined parameter is in a range of 1 to N.

33. The apparatus according to clause 32, where the predetermined value is set as 1.

34. The apparatus according to clause 32, wherein the predetermined value is associated with a target coding tree (CTB) and is determined based on previously decoded neighboring CTBs.

35. The apparatus according to clause 34, wherein the first filter index is associated with a previously decoded top CTB or a previously decoded left CTB, and the one or more processors are further configured to execute the instructions to cause the apparatus to perform:

in response to the value of the first filter index being non-zero, setting the predetermined value as 1.

36. An apparatus for performing video processing using Cross-Component Adaptive Loop Filter (CCALF), the apparatus comprising:
a memory figured to store instructions; and
one or more processors configured to execute the instructions to cause the apparatus to perform:
receiving a bitstream associated with a video slice;
generating, based on the bitstream, a plurality of reconstructed blocks associated with the video slice;
classifying the plurality of reconstructed blocks into one or more classes based on characteristics of the plurality of reconstructed blocks;
determining, based on the bitstream, a set of CCALF coefficients for each of the one or more classes; and
filtering the one or more classes of reconstructed blocks using the respective sets of CCALF coefficients.

37. The apparatus according to clause 36, wherein the plurality of blocks are luma blocks.

38. The apparatus according to clause 37, wherein each luma pixel of the video sequence is classified into one of the plurality of classes.

39. The apparatus according to clause 36, wherein the one or more classes include M classes, M being a positive integer, and wherein in classifying the plurality of reconstructed blocks into one or more classes based on characteristics of the plurality of reconstructed blocks, the one or more processors are further configured to execute the instructions to cause the apparatus to perform:
classifying the plurality of reconstructed blocks into N classes based on characteristics of the plurality of reconstructed blocks, N being an integer larger than M; and
merging the N classes into the one or more classes.

40. The apparatus according to clause 39, wherein the plurality of classes are merged based on a similarity of the filter coefficients of the CCALFs associated with the plurality of classes.

51. A non-transitory computer readable medium that stores a set of instructions that is executable by one or more processors of an apparatus to cause the apparatus to initiate a method for video processing using Cross-Component Adaptive Loop Filter (CCALF), the method comprising:
filtering decoded video content using a CCALF, wherein the CCALF is a 24-tap 9×9 filter.

52. The non-transitory computer readable medium according to clause 51, wherein the 24-tap 9×9 filter has a cross shape defined as:

$$\begin{bmatrix} & & & & C_0 & & & & \\ & & & & C_1 & & & & \\ & & & & C_2 & & & & \\ & & & & C_3 & & & & \\ C_9 & C_{10} & C_{11} & C_{12} & C_4 & C_{13} & C_{14} & C_{15} & C_{16} \\ C_{17} & C_{18} & C_{19} & C_{20} & C_5 & C_{21} & C_{22} & C_{23} & C_{24} \\ & & & & C_6 & & & & \\ & & & & C_7 & & & & \\ & & & & C_8 & & & & \end{bmatrix}$$

wherein $C_0$ to $C_{24}$ are filter coefficients of the 24-tap 9×9 filter.

53. The non-transitory computer readable medium according to clause 51 or 52, wherein the decoded video content comprises a video slice, and the 24-tap 9×9 filter is applied to all coding tree units (CTUs) of the video slice.

54. The non-transitory computer readable medium according to any one of clauses 51 to 53, wherein values of the filter coefficients are integer values between −64 and +64.

55. The non-transitory computer readable medium according to any one of clauses 51 to 54, wherein the filter coefficients are coded using variable length code.

56. A non-transitory computer readable medium that stores a set of instructions that is executable by one or more processors of an apparatus to cause the apparatus to initiate a method for video processing using Cross-Component Adaptive Loop Filter (CCALF), the method comprising:
receiving a bitstream;
determining a CCALF based on a first index signaled in the bitstream;
determining a first filter shape based on a second index signaled in the bitstream, the first filter shape being selected from a set of pre-defined filter shapes for the CCALF;
determining, based on the first index, filter coefficients of the CCALF; and
filtering decoded video content using the first filter shape and the filter coefficients.

57. The non-transitory computer readable medium according to clause 56, wherein values of the filter coefficients are integer values between −64 and +64.

58. The non-transitory computer readable medium according to clause 56 or 57, wherein the filter coefficients are coded using variable length code.

59. The non-transitory computer readable medium according to any one of clauses 56 to 58, wherein the first index is indicated by a syntax element signaled in the bitstream, the syntax element is associated with a coding tree block (CTB), and the method further comprises:
context decoding a first bin and a second bin of the syntax element.

60. A non-transitory computer readable medium that stores a set of instructions that is executable by one or more processors of an apparatus to cause the apparatus to initiate a method for video processing using Cross-Component Adaptive Loop Filter (CCALF), the method comprising:
receiving a bitstream;
determining a CCALF based on a first index signaled in the bitstream;
determining a first filter shape based on characteristics of a reconstructed block, the first filter shape being selected from a set of pre-defined filter shapes for the CCALF;
determining, based on the first index, filter coefficients of the CCALF; and
filtering decoded video content using the first filter shape and the filter coefficients.

61. A non-transitory computer readable medium that stores a set of instructions that is executable by one or more processors of an apparatus to cause the apparatus to initiate a method for video processing using Cross-Component Adaptive Loop Filter (CCALF), the method comprising:
receiving a bitstream;
determining N CCALFs based on the bitstream;
determining a first filter based on the bitstream, the first filter being one of the N CCALFs; and
filtering decoded video content using the first filter.

62. The non-transitory computer readable medium according to clause 61, wherein determining the first filter based on the bitstream, further comprises:

determining a first filter index based on a mapped filter index, wherein: in response to a value of the mapped filter index being less than a predetermined value, a value of the first filter index is set as the value of the mapped filter index plus 1, or in response to the value of the mapped filter index being greater than the predetermined value, the value of the first filter index is set as the value of the mapped filter index; and determining the first filter based on the first filter index, wherein the predetermined parameter is in a range of 1 to N.

63. The non-transitory computer readable medium according to clause 62, where the predetermined value is set as 1.

64. The non-transitory computer readable medium according to clause 62, wherein the predetermined value is associated with a target coding tree (CTB) and is determined based on previously decoded neighboring CTBs.

65. The non-transitory computer readable medium according to clause 64, wherein the first filter index is associated with a previously decoded top CTB or a previously decoded left CTB, and the method further comprises:

in response to the value of the first filter index being non-zero, setting the predetermined value as 1.

66. A non-transitory computer readable medium that stores a set of instructions that is executable by one or more processors of an apparatus to cause the apparatus to initiate a method for video processing using Cross-Component Adaptive Loop Filter (CCALF), the method comprising:

receiving a bitstream associated with a video slice;
generating, based on the bitstream, a plurality of reconstructed blocks associated with the video slice;
classifying the plurality of reconstructed blocks into one or more classes based on characteristics of the plurality of reconstructed blocks;
determining, based on the bitstream, a set of CCALF coefficients for each of the one or more classes; and
filtering the one or more classes of reconstructed blocks using the respective sets of CCALF coefficients.

67. The non-transitory computer readable medium according to clause 66, wherein the plurality of blocks are luma blocks.

68. The non-transitory computer readable medium according to clause 67, wherein each luma pixel of the video sequence is classified into one of the plurality of classes.

69. The non-transitory computer readable medium according to clause 66, wherein the one or more classes include M classes, M being a positive integer, and wherein classifying the plurality of reconstructed blocks into one or more classes based on characteristics of the plurality of reconstructed blocks, further comprises:

classifying the plurality of reconstructed blocks into N classes based on characteristics of the plurality of reconstructed blocks, N being an integer larger than M; and merging the N classes into the one or more classes.

70. The non-transitory computer readable medium according to clause 69, wherein the plurality of classes are merged based on a similarity of the filter coefficients of the CCALFs associated with the plurality of classes.

71. A non-transitory computer readable medium storing a bitstream, wherein the bitstream comprises an index associated with video data for Cross-Component Adaptive Loop Filter (CCALF), the index indicating a filter shape selected from a set of filter shapes.

72. A method for video processing using Cross-Component Adaptive Loop Filter (CCALF), comprising:

filtering video content using a CCALF, wherein the CCALF is a 24-tap 9×9 filter.

73. The method according to claim 72, wherein the 24-tap 9×9 filter has a cross shape defined as:

$$\begin{bmatrix} & & & & C_0 & & & & \\ & & & & C_1 & & & & \\ & & & & C_2 & & & & \\ & & & & C_3 & & & & \\ C_9 & C_{10} & C_{11} & C_{12} & C_4 & C_{13} & C_{14} & C_{15} & C_{16} \\ C_{17} & C_{18} & C_{19} & C_{20} & C_5 & C_{21} & C_{22} & C_{23} & C_{24} \\ & & & & C_6 & & & & \\ & & & & C_7 & & & & \\ & & & & C_8 & & & & \end{bmatrix}$$

wherein $C_0$ to $C_{24}$ are filter coefficients of the 24-tap 9×9 filter.

74. The method according to claim 72, wherein the video content comprises a video slice, and the 24-tap 9×9 filter is applied to all coding tree units (CTUs) of the video slice.

75. The method according to any one of claim 72, wherein values of the filter coefficients are integer values between −64 and +64.

76. The method according to claim 72, wherein the filter coefficients are coded using variable length code.

77. A non-transitory computer readable medium storing a bitstream, wherein the bitstream comprises a first index associated with encoded video data, the first index identifying a Cross-Component Adaptive Loop Filter (CCALF), wherein the CCALF is a 24-tap 9×9 filter, and the first index causes a decoder to filter decoded video content using the 24-tap 9×9 filter.

78. The non-transitory computer readable medium according to claim 77, wherein the 24-tap 9×9 filter has a cross shape defined as:

$$\begin{bmatrix} & & & & C_0 & & & & \\ & & & & C_1 & & & & \\ & & & & C_2 & & & & \\ & & & & C_3 & & & & \\ C_9 & C_{10} & C_{11} & C_{12} & C_4 & C_{13} & C_{14} & C_{15} & C_{16} \\ C_{17} & C_{18} & C_{19} & C_{20} & C_5 & C_{21} & C_{22} & C_{23} & C_{24} \\ & & & & C_6 & & & & \\ & & & & C_7 & & & & \\ & & & & C_8 & & & & \end{bmatrix}$$

wherein $C_0$ to $C_{24}$ are filter coefficients of the 24-tap 9×9 filter.

79. The non-transitory computer readable medium according to claim 77, wherein the bitstream further comprises a coded syntax element, the encoded syntax element comprising filter coefficients of the 24-tap 9×9 filter.

80. The non-transitory computer readable medium according to claim 79, wherein the filter coefficients are coded using variable length code.

81. The non-transitory computer readable medium according to claim 77, wherein the first index indicating a first CCALF for Cr component, the bitstream further comprises a second index indicating a second CCALF for Cb component, the first CCALF is a first 24-tap 9×9 filter, the second CCALF is a second 24-tap 9×9 filter, and the first index and the second index cause the decoder to filter the Cr component of the decoded video content using the first 24-tap 9×9 filter, and filter the Cb component of the decoded video content using the second 24-tap 9×9 filter.

82. The non-transitory computer readable medium according to claim 81, wherein the bitstream further comprises a coded syntax element, the coded syntax element comprising filter coefficients of the first 24-tap 9×9 filter and filter coefficients of the second 24-tap 9×9 filter.

83. The non-transitory computer readable medium according to claim 82, wherein in the bitstream, the filter coefficients of the first 24-tap 9×9 filter and the filter coefficients of the second 24-tap 9×9 filter are coded using variable length code.

In some embodiments, a non-transitory computer-readable storage medium is also provided. In some embodiments, the medium can store all or portions of the video bitstream having the indices, flags, and/or syntax elements that indicate the parameters associated with the CCALF. In some embodiments, the medium can store instructions that may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for video processing using Cross-Component Adaptive Loop Filter (CCALF), comprising:
   filtering decoded video content using a CCALF, wherein the CCALF is a 24-tap 9×9 filter having a cross shape defined as:

$$\begin{bmatrix} & & & & C_0 & & & & \\ & & & & C_1 & & & & \\ & & & & C_2 & & & & \\ & & & & C_3 & & & & \\ C_9 & C_{10} & C_{11} & C_{12} & C_4 & C_{13} & C_{14} & C_{15} & C_{16} \\ C_{17} & C_{18} & C_{19} & C_{20} & C_5 & C_{21} & C_{22} & C_{23} & C_{24} \\ & & & & C_6 & & & & \\ & & & & C_7 & & & & \\ & & & & C_8 & & & & \end{bmatrix}$$

wherein $C_0$ to $C_{24}$ are filter coefficients of the 24-tap 9×9 filter.

2. The method according to claim 1, wherein the decoded video content comprises a video slice, and the 24-tap 9×9 filter is applied to all coding tree units (CTUs) of the video slice.

3. The method according to any one of claim 1, wherein values of the filter coefficients are integer values between −64 and +64.

4. The method according to claim 1, wherein the filter coefficients are coded using variable length code.

5. A method for video processing using Cross-Component Adaptive Loop Filter (CCALF), comprising:
   filtering video content using a CCALF, wherein the CCALF is a 24-tap 9×9 filter having a cross shape defined as:

$$\begin{bmatrix} & & & & C_0 & & & & \\ & & & & C_1 & & & & \\ & & & & C_2 & & & & \\ & & & & C_3 & & & & \\ C_9 & C_{10} & C_{11} & C_{12} & C_4 & C_{13} & C_{14} & C_{15} & C_{16} \\ C_{17} & C_{18} & C_{19} & C_{20} & C_5 & C_{21} & C_{22} & C_{23} & C_{24} \\ & & & & C_6 & & & & \\ & & & & C_7 & & & & \\ & & & & C_8 & & & & \end{bmatrix}$$

wherein $C_0$ to $C_{24}$ are filter coefficients of the 24-tap 9×9 filter.

6. The method according to claim 5, wherein the video content comprises a video slice, and the 24-tap 9×9 filter is applied to all coding tree units (CTUs) of the video slice.

7. The method according to any one of claim 5, wherein values of the filter coefficients are integer values between −64 and +64.

8. The method according to claim 5, wherein the filter coefficients are coded using variable length code.

9. A non-transitory computer readable medium storing a bitstream, wherein the bitstream comprises a first index associated with encoded video data, the first index identifying a Cross-Component Adaptive Loop Filter (CCALF), wherein the CCALF is a 24-tap 9×9 filter having a cross shape defined as:

$$\begin{bmatrix} & & & & C_0 & & & & \\ & & & & C_1 & & & & \\ & & & & C_2 & & & & \\ & & & & C_3 & & & & \\ C_9 & C_{10} & C_{11} & C_{12} & C_4 & C_{13} & C_{14} & C_{15} & C_{16} \\ C_{17} & C_{18} & C_{19} & C_{20} & C_5 & C_{21} & C_{22} & C_{23} & C_{24} \\ & & & & C_6 & & & & \\ & & & & C_7 & & & & \\ & & & & C_8 & & & & \end{bmatrix}$$

wherein $C_0$ to $C_{24}$ are filter coefficients of the 24-tap 9×9 filter, and the first index causes a decoder to filter decoded video content using the 24-tap 9×9 filter.

10. The non-transitory computer readable medium according to claim 9, wherein the bitstream further comprises a coded syntax element, the encoded syntax element comprising filter coefficients of the 24-tap 9×9 filter.

11. The non-transitory computer readable medium according to claim 10, wherein the filter coefficients are coded using variable length code.

12. The non-transitory computer readable medium according to claim 9, wherein the first index indicating a first CCALF for Cr component, the bitstream further comprises a second index indicating a second CCALF for Cb component, the first CCALF is a first 24-tap 9×9 filter, the second CCALF is a second 24-tap 9×9 filter, and the first index and the second index cause the decoder to filter the Cr component of the decoded video content using the first 24-tap 9×9 filter, and filter the Cb component of the decoded video content using the second 24-tap 9×9 filter.

13. The non-transitory computer readable medium according to claim 12, wherein the bitstream further comprises a coded syntax element, the coded syntax element comprising filter coefficients of the first 24-tap 9×9 filter and filter coefficients of the second 24-tap 9×9 filter.

14. The non-transitory computer readable medium according to claim 13, wherein in the bitstream, the filter coefficients of the first 24-tap 9×9 filter and the filter coefficients of the second 24-tap 9×9 filter are coded using variable length code.

* * * * *